US012128000B2

(12) United States Patent
Huang et al.

(10) Patent No.: US 12,128,000 B2
(45) Date of Patent: Oct. 29, 2024

(54) AIRWAY SYSTEM OF A MASSAGE POOL, COMPRISES AN AIR PUMP AND AN AIRWAY UNIT

(71) Applicant: Intex Marketing Ltd., Tortola (VG)

(72) Inventors: Zhi Xiong Huang, Fujian (CN); Ai Ming Tan, Fujian (CN)

(73) Assignee: Intex Marketing Ltd., Tortola (VG)

( * ) Notice: Subject to any disclaimer, the term of this patent is extended or adjusted under 35 U.S.C. 154(b) by 0 days.

(21) Appl. No.: 18/578,550

(22) PCT Filed: Jul. 15, 2022

(86) PCT No.: PCT/IB2022/056545
§ 371 (c)(1),
(2) Date: Jan. 11, 2024

(87) PCT Pub. No.: WO2023/286030
PCT Pub. Date: Jan. 19, 2023

(65) Prior Publication Data

US 2024/0261183 A1 Aug. 8, 2024

(30) Foreign Application Priority Data

Jul. 15, 2021 (CN) ......................... 202110800425.0
Jul. 15, 2021 (CN) ......................... 202110801708.7
(Continued)

(51) Int. Cl.
*A61H 33/02* (2006.01)

(52) U.S. Cl.
CPC ... *A61H 33/028* (2013.01); *A61H 2201/0103* (2013.01); *A61H 2201/5053* (2013.01)

(58) Field of Classification Search
CPC .......... A61H 33/028; A61H 2201/0103; A61H 2201/5053; A61H 33/6005; F16K 11/074; A47K 3/06; E04H 4/00
(Continued)

(56) References Cited

U.S. PATENT DOCUMENTS 3,810,464 A 5/1974 Sheeler
4,566,443 A 1/1986 Bucher
(Continued)

FOREIGN PATENT DOCUMENTS

CN 1596864 3/2005
CN 2794505 7/2006
(Continued)

OTHER PUBLICATIONS

International Search Report issued by the International Searching Authority, dated Dec. 5, 2022, for International Patent Application No. PCT/IB2022/056545; 14 pages.
(Continued)

*Primary Examiner* — Lori L Baker
(74) *Attorney, Agent, or Firm* — Faegre Drinker Biddle & Reath LLP

(57) ABSTRACT

An airway device of a massage pool may comprise an air pump and an airway unit. The airway unit may comprise an operating member; a pipeline, and a control mechanism, The pipeline may be formed with an air connection portion. The air connection portion may have a first air connection passage and a second air connection passage. The air pump may be attached to the pipeline. The control mechanism may be coupled on the pipeline. The operating member may be connected to the control mechanism in a driving manner. The operating member and the control mechanism may cooperate to control the airway unit to change to a first intake state in which the first air connection passage is
(Continued)

inflated by the air pump, an exhaust state in which the second air connection passage is exhausted by the air pump, and a second intake state in which the second air connection passage is inflated by the air pump.

17 Claims, 21 Drawing Sheets

(30) Foreign Application Priority Data

Jul. 15, 2021 (CN) ......................... 202121613986.1
Jul. 15, 2021 (CN) ......................... 202121618990.7

(58) Field of Classification Search
USPC .................................... 4/541.5, 541.4, 541.1
See application file for complete search history.

(56) References Cited

U.S. PATENT DOCUMENTS

| | | | |
|---|---|---|---|
| 4,773,104 | A | 9/1988 | Wang |
| 4,981,543 | A | 1/1991 | Popovich |
| 5,283,915 | A | 2/1994 | Idland |
| 5,809,942 | A | 9/1998 | Kralovec |
| 6,003,166 | A | 12/1999 | Hald |
| 6,108,829 | A | 8/2000 | Wadsworth |
| 6,199,224 | B1 | 3/2001 | Versland |
| 6,357,059 | B1 | 3/2002 | Lau |
| 6,412,123 | B1 | 7/2002 | Lau |
| 7,334,274 | B2 | 2/2008 | Wang |
| 7,503,082 | B2 | 3/2009 | Castellote |
| 11,179,733 | B1 | 11/2021 | Wang et al. |
| 2005/0050627 | A1 | 3/2005 | Ayeni |
| 2006/0115248 | A1 | 6/2006 | Tran |
| 2006/0260038 | A1 | 11/2006 | Lau |
| 2011/0010836 | A1 | 1/2011 | Lau |
| 2012/0124732 | A1 | 5/2012 | Lau |
| 2018/0231283 | A1 | 8/2018 | Willers |
| 2022/0241148 | A1 | 8/2022 | Wang |
| 2022/0325546 | A1 | 10/2022 | Lin |

FOREIGN PATENT DOCUMENTS

| | | | | | |
|---|---|---|---|---|---|
| CN | 202732280 | | | 2/2013 | |
| CN | 109424221 | | | 3/2019 | |
| CN | 109424221 | A | * | 3/2019 | ......... A61H 33/0087 |
| CN | 111895140 | | | 11/2020 | |
| CN | 111895140 | A | | 11/2020 | |
| CN | 112443180 | A | * | 3/2021 | ......... A61H 33/0087 |
| CN | 112502498 | | | 3/2021 | |
| CN | 214806641 | U | * | 11/2021 | ......... A61H 33/0087 |
| CN | 216517140 | U | * | 5/2022 | ......... A61H 33/0087 |
| CN | 220377954 | U | * | 1/2024 | ......... A61H 33/0087 |
| EP | 0168822 | | | 1/1986 | |
| EP | 0967446 | | | 12/1999 | |
| EP | 0967446 | B3 | | 12/1999 | |
| EP | 4238545 | A1 | * | 9/2023 | ......... A61H 33/0087 |
| JP | 2006308009 | | | 11/2006 | |
| JP | 4041132 | | | 1/2008 | |
| WO | 2015/010058 | | | 1/2015 | |
| WO | 2021/042966 6 | | | 3/2021 | |
| WO | 2021042996 | | | 3/2021 | |

OTHER PUBLICATIONS

International Preliminary Report on Patentability issued by the International Preliminary Examining Authority, dated Jun. 28, 2023, for International Patent Application No. PCT/IB2022/056545; 23 pages.

Invitation to Pay Additional Fee issued by the International Searching Authority, dated Oct. 14, 2022, for International Patent Application No. PCT/IB2022/056545; 9 pages.

* cited by examiner

AIRWAY SYSTEM OF A MASSAGE POOL, COMPRISES AN AIR PUMP AND AN AIRWAY UNIT

RELATED APPLICATIONS

The present application is a national stage entry of International (PCT) Patent Application Number PCT/IB2022/056545, filed Jul. 15, 2022, which claims priority to Chinese Patent Application No. CN202110801708.7, filed Jul. 15, 2021; Chinese Utility Model Application No. CN20212168990.7, filed Jul. 15, 2021; Chinese Patent Application No. CN202110800425.0, filed Jul. 15, 2021; and Chinese Utility Model Application No. CN202121613986.1, filed Jul. 15, 2021, the entire disclosures of which are expressly incorporated by reference herein.

Additionally, the present application is related to Chinese Utility Model Application No.: CN202121613803.6 filed Jul. 15, 2021; Chinese Utility Model Application Number No. CN202121614976.X, filed Jul. 15, 2021; Chinese Utility Model Application No. CN202121613882.0, filed Jul. 15, 2021, the entire disclosures of which are expressly incorporated by reference herein.

FIELD

The present disclosure relates to the technical field of a massage pool and its accessories, in particular to an airway device of a massage pool and its control device and a massage pool.

BACKGROUND

The airway unit of the existing massage pool, such as CN112502498A, has a ventilation portion, a first air connection portion, a switching valve, a first attachment structure, and a control mechanism that can be detachably connected to the massage pool.

SUMMARY

In an exemplary embodiment of the present disclosure, the present disclosure provides an airway device of a massage pool and a control device thereof and a massage pool.

In another exemplary embodiment of the present disclosure, an airway device of a massage pool is provided. The airway device comprising an air pump and an airway unit. The airway unit comprising an operating member, a pipeline, and a control mechanism. The pipeline is formed with an air connection portion. The air connection portion has a first air connection passage and a second air connection passage. The air pump is attached to the pipeline. The control mechanism is coupled on the pipeline. The operating member is connected to the control mechanism in a driving manner. The operating member and the control mechanism cooperate to control the airway unit to change to a first intake state in which the first air connection passage is inflated by the air pump, an exhaust state in which the second air connection passage is exhausted by the air pump, and a second intake state in which the second air connection passage is inflated by the air pump.

In an example thereof, the airway unit is formed with an inner chamber and an outer chamber. The outer chamber is provided with a connecting port and an outer port which may be connected to the outside. The air pump is arranged between the connecting port and the inner chamber. The control mechanism is provided with a ventilation passage. In the first intake state, the outer port is connected to the connecting port and the inner chamber is connected to the first air connection passage. In the exhaust state, the connecting port and the second air connection passage are connected through the outer chamber and the outer port is connected to the inner chamber. In the second intake state, the outer port and the connecting port are connected and the ventilation passage is connected to the inner chamber and the second air connection passage. In a variation thereof, the control mechanism comprises a reversing piece and a reversing valve core group. The reversing piece is rotatable relative to the pipeline at a connecting position wherein the connecting port is connected to the outer port and an isolating position where the connecting port is isolated from the outer port. The reversing valve core group is rotatable relative to the pipeline between a first intake position, an exhaust position and a second intake position. In the first intake state, the reversing piece turns to the connecting position and the reversing valve core group turns to the first intake position. In the exhaust state, the reversing piece turns to the isolating position and the reversing valve core group turns to the exhaust position. In the second intake state, the reversing piece turns to the connecting position and the reversing valve core group turns to the second intake position. The operating member is connected to the reversing piece and the reversing valve core in a drive manner and drives the reversing piece and the reversing valve core group to rotate. In another variation thereof, the first intake position of the reversing valve core group is located between the exhaust position of the reversing valve core group and the second intake position of the reversing valve core group. In a further variation thereof, the control mechanism further comprises a drive shaft. The operating member is connected to the drive shaft to drive the drive shaft to rotate to three positions respectively corresponding to the first intake state, the exhaust state and the second intake state. The drive shaft is connected to the reversing piece and the reversing valve core group in a drive manner and drives the reversing piece to rotate between the connecting position and the isolating position through the rotation of the driving shaft, and drives the reversing valve core group to rotate between the first intake position, the exhaust position, and the second intake position. In yet a further variation thereof, a first elastic body and a limiting structure are arranged between the reversing piece and the pipeline. The reversing piece is controlled by the cooperation of the first elastic body and the limiting structure to be reset to or maintained in the connecting position. The reversing piece is sleeved on the drive shaft and a transmission structure is arranged between the reversing piece and the drive shaft. The drive shaft drives the reversing piece to the isolating position through the transmission structure. The drive shaft and the reversing valve core group are synchronously rotated and connected. In still a further variation thereof, the reversing piece is capable of being sleeved on the inner hole of the driving shaft. The inner peripheral wall of the inner hole is protrudingly provided with a protrusion. The driving shaft is concavely provided with a central angle groove. The protrusion is located in the central angle groove. The groove wall of the central angle groove and the protrusion can abut and cooperate to form the above-mentioned transmission structure.

In another example thereof, the pipeline is fixed with a sealing plate and the outer chamber and the inner chamber are separated by the sealing plate. The sealing plate is provided with two outer through holes. The reversing valve core group comprises a valve core plate and an air baffle plate that are fixedly connected to each other. The valve core plate is provided with two first inner through holes and a second inner through hole. The air passage is formed between the sealing plate and the valve core plate. The two outer through holes are matched with the two first inner through holes and are controlled by the rotation of the reversing valve core group to be aligned and connected at the exhaust position or staggered and closed at the first and second intake positions. When the inner chamber and the air baffle plate are matched and the reversing valve core group is in the first intake position, the inner chamber and the first air connection passage are connected. When the reversing valve core group is in the second intake position and the exhaust position, the inner chamber and the first air connection passage are isolated by the air baffle plate, the second air connection passage at the exhaust position, a first inner through hole, an outer through hole and the connecting port are sequentially connected to the inner chamber, another first inner through hole, another outer through hole and the outer port, and the air connection passage at the second intake position is respectively connected to the inner chamber and the second air connection passage through the second inner through hole and at least one first inner through hole. In a variation thereof, the valve core plate and the sealing plate face and abut, the abutting end face of the valve core plate is concavely provided with a groove. The second inner through hole is set at the bottom of the groove. The groove between the valve core plate and the sealing plate constitutes a connecting chamber. The connecting chamber constitutes the air connection passage. The connecting chamber is connected to the upper port of the at least one first inner through hole. When the reversing valve core group is in the first and second intake positions, the end face of the valve core plate is sealed and matched with the outer through hole. A gap is provided between the sealing plate and the upper port of the first inner through hole. In a further variation thereof, the pipeline is provided with a groove body. The lower port of the first inner through hole in the second intake position is connected to the groove body. The second air connection passage is connected to the groove body. In yet another variation thereof, the valve core plate is located under the sealing plate. The drive shaft passes through the sealing plate and is connected to the valve core plate. In still another variation thereof, the second air connection passage has an air connection port arranged upward. The air connection port is provided with a control valve capable of changing between a uni-directional state and an open state. The peripheral portion of at least one of the first inner through holes of the valve core plate extends downward to form an abutting convex base. The bottom surface of the valve core plate is matched with the control valve. The control valve is controlled to be in the uni-directional state and the open state by whether the abutting convex base abuts against and compresses the control valve.

In yet a further example thereof, a second elastic body is arranged between the air baffle plate and the pipeline.

In still yet a further example thereof, the pipeline has an air connection section, a connecting section and a middle section arranged between the air connection section and the connecting section. The air connection section is pipe-in-pipe structure and the inner pipe constitute the second air connection passage and the gap between the inner and outer pipes constitutes the first air connection passage. The upper edge of the middle section extends upward to form a peripheral wall. The sealing plate is fixed in the peripheral wall, and the inner of the peripheral wall and the upper part of the sealing plate constitute the outer chamber. The inner of the middle section and the lower part of the sealing plate constitute the inner chamber. The peripheral wall is provided with the connecting port and the outer through port. The connecting section is connected to the connecting port and the outer connecting port. The connecting section is connected to the connecting port and the air pump is arranged in the connecting section. In a variation thereof, the air connection section is fixedly provided with a first connecting base protruding into the middle section. The upper end face of the first connecting base is provided with the air connection port of the second air connection passage of the inner pipe and the first connection base seals the middle and upper part of the gap between the inner and outer pipes. The connecting section is fixed with a second connection base that protrudes into the middle section, and the second connection base is provided with a through hole throughout upper and lower. The inner chamber connects the lower part of the gap between the inner and outer pipes and the connecting section. The valve core plate is abutted on the first connecting base and the second connecting base. The through hole can be matched with the first inner through hole. The air connection port can be matched with the first inner through hole.

In a further exemplary embodiment of the present disclosure, a control device for an airway device of a massage pool is provided. The airway device includes a pipeline. The control device comprising a control mechanism, and an operating member. The control mechanism comprising a reversing piece, a reversing valve core group and a drive shaft. The reversing piece rotates in a connecting position and an isolating position relative to the pipeline. The reversing valve core group rotates relative to the pipeline between a first intake position, an exhaust position and a second intake position. The operating member is connected to the drive shaft in a drive manner and drives the drive shaft to rotate to at least three positions to change to a first intake state, an exhaust state and a second intake state. The drive shaft drives and connects the reversing piece and the reversing valve core group and drives the reversing piece and the reversing valve core group to rotate through the rotation of the drive shaft. In the first intake state, the reversing piece turns to the connecting position and the reversing valve core group turns to the first intake position. In the exhaust state, the reversing piece turns to the isolating position and the reversing valve core group turns to the exhaust position. In the second intake state, the reversing piece turns to the connecting position and the reversing valve core group turns to the second intake position.

In still a further exemplary embodiment of the present disclosure, a massage pool is provided. The massage pool comprising a pool body and a pool chamber surrounded by the pool body. The pool body is provided with a first air connection port that is connected to the pool chamber. An air chamber is formed in the pool body and the pool body is provided with a second air connection port. The massage pool further comprising the airway device of a massage pool according to according to the prior exemplary embodiment and optionally any of the previous examples and variations. The first air connection passage and the second air connection passage are respectively connected to the first air connection port of the pool body and the second air connection port of the pool body.

In yet another exemplary embodiment of the present disclosure, a transmission mechanism is provided. The transmission mechanism comprising an installation base, a drive shaft, a first movable member, and a second movable member. The drive shaft can rotate relative to the installation base. The first movable member and the drive shaft are synchronously rotated and connected together. The drive shaft can drive the first movable member to rotate to two extreme positions and a middle position between the two extreme positions relative to the installation base. The second movable member is sleeved on the outside of the drive shaft. The second movable member can be rotated to a first position and a second position relative to the installation base. An elastic body and a limiting structure are arranged between the second movable member and the installation base. The elastic body and the limiting structure cooperate to drive the second movable member to maintain or reset to the first position. A transmission structure is arranged between the drive shaft and the second movable member. The drive shaft rotates and drives the second movable member to rotate to the second position through the transmission structure. The second position corresponds to one extreme position.

In an example thereof, the second movable member is capable of being sleeved on an inner hole of the drive shaft. An inner peripheral wall of the inner hole is protruded with a first protrusion. The drive shaft is concavely formed with a central angle groove. The first protrusion is located in the central angle groove. The groove wall of the central angle groove and the first protrusion can abut and cooperate to form the transmission structure.

In another example thereof, the second movable member is capable of being sleeved on an inner hole of the drive shaft. An inner peripheral wall of the inner hole is concavely provided with a central angle groove. The drive shaft is protruded with a first protrusion is located in the central angle groove. The groove wall of the central angle groove and the first protrusion can abut and cooperate to form the transmission structure. In a variation thereof, the central angle between the first position and the second position is not greater than the central angle between the middle position and an extreme position corresponding to the second position. In another variation thereof, the central angle of the central angle groove is smaller than the central angle of the two extreme positions and not smaller than the central angle between the middle position and an extreme position corresponding to the second position.

In a further example thereof, the second movable member is capable of being sleeved on an inner hole of the drive shaft. An inner peripheral wall of the inner hole is protruded with a first protrusion. The drive shaft is concavely formed with a central angle groove. The first protrusion is located in the central angle groove. A first wall of the groove wall of the central angle groove is protruded with an abutting protrusion. The abutting protrusion and the first protrusion can abut and cooperate to form the transmission structure.

In yet another example thereof, a second protrusion is protruded from the installation base. The second movable member can abut against the second protrusion to form the limiting structure.

In still another example thereof, the installation base comprises a fixing plate. The drive shaft can rotatably pass through the fixing plate. The first movable member is fixedly connected to the drive shaft and is located under the fixing plate. The second movable member is located on the fixing plate. The elastic body comprises a torsion spring. The torsion spring connects the fixing plate and the second movable member.

In a further still example thereof, a reinforcing rib is protruded from the middle of the bottom of the central angle groove. The end face of the reinforcing rib is set as an outer arc surface. The end face of the first protrusion is provided with an inner arc surface. The outer arc surface is matched with the inner arc surface.

In yet still another exemplary embodiment of the present disclosure, a driving mechanism is provided. The driving mechanism comprising an operating member and the transmission mechanism according to the prior exemplary embodiment and optionally any of the previous examples and variations. The operating member and the drive shaft are fixedly mounted together.

BRIEF DESCRIPTION OF DRAWINGS

The foregoing aspects and many of the intended advantages of this disclosure will become more readily appreciated as the same becomes better understood by reference to the following detailed description when taken in conjunction with the accompanying drawings.

Figure 1:
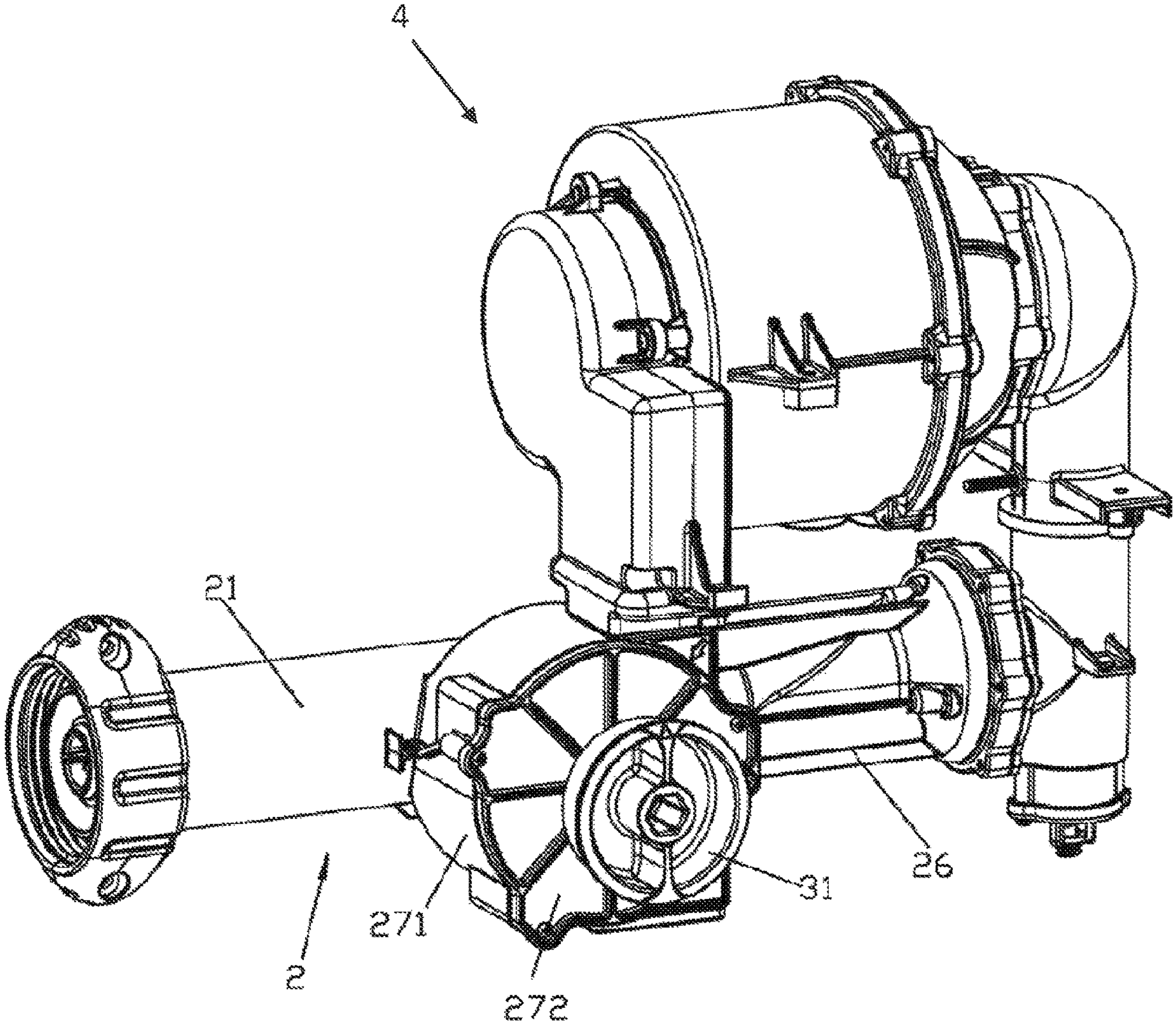
FIG. 1 illustrates a three-dimensional schematic view of an exemplary airway device of a massage pool.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the disclosure, and such exemplifications are not to be construed as limiting the scope of the disclosure in any manner.

DETAILED DESCRIPTION OF THE DRAWINGS

For the purposes of promoting an understanding of the principals of the disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings. It will be understood that no limitation of the scope of the disclosure is thereby intended. The disclosure includes any alterations and further modifications in the illustrative devices and described methods and further applications of the principles of the disclosure which would normally occur to one skilled in the art to which the disclosure relates.

In the description, it should be noted that the terms upper, lower, inner, outer, top/bottom, etc. indicating the orientation or positional relationship based on the orientation shown in the drawings are only for the convenience of simplifying the description, rather than indicating or implying that the pointed device or element must have a specific orientation, be constructed and operated in a specific orientation, and therefore cannot be understood as a limitation of the present disclosure. In addition, the terms first and second are only used for descriptive purposes, and cannot be understood as indicating or implying relative importance.

The terms "couples", "coupled", "coupler", and variations thereof are used to include both arrangements wherein two or more components are in direct physical contact and arrangements wherein the two or more components are not in direct contact with each other (e.g., the components are "coupled" via at least a third component, but yet still cooperates or interact with each other).

The present disclosure is related to the devices and systems disclosed in the following applications: PCT Patent Application No. PCT/IB2022/056556, filed Jul. 15, 2022, titled AIRWAY STRUCTURE OF A MASSAGE POOL WITH COMPENSATION FUNCTION AND A MASSAGE POOL; PCT Patent Application No. PCT/IB2022/056536, filed Jul. 15, 2022, titled AN AIRWAY STRUCTURE OF A MASSAGE POOL WITH A CONTROL VALVE; and PCT Patent Application No. PCT/IB2022/056542, filed Jul. 15, 2022, titled AN AIR CONNECTION PIPING DEVICE FOR A MASSAGE POOL, A POOL BODY OF A MASSAGE POOL AND A MASSAGE POOL, the entire disclosures of which are expressly incorporated by reference herein.

Figure 2:
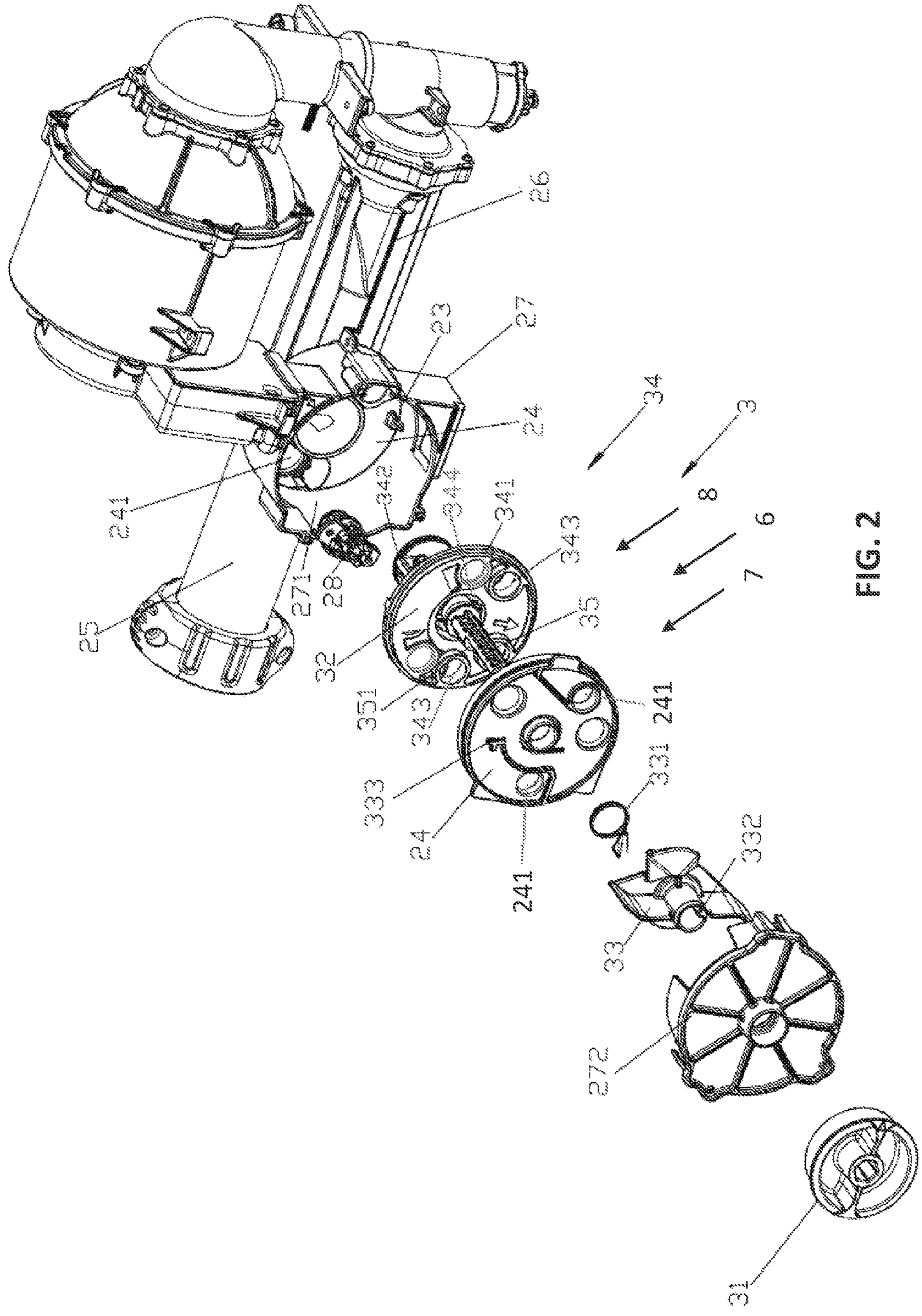
FIG. 2 illustrates a perspective exploded view of the airway device of FIG. 1.

Referring to FIGS. 1-21, the airway device of a massage pool comprises an air pump 1 (see FIG. 3), an airway unit 4 (see FIG. 1), and an operating member 31 (see FIG. 1). The airway unit 4 comprises a pipeline 2 (see FIG. 1) and a control mechanism 3 (see FIG. 2). Additionally details regarding an exemplary pipeline 2 are found in PCT Patent Application No. PCT/IB2022/056542, filed Jul. 15, 2022, titled AN AIR CONNECTION PIPING DEVICE FOR A MASSAGE POOL, A POOL BODY OF A MASSAGE POOL AND A MASSAGE POOL, the entire disclosure of which is expressly incorporated by reference herein.

Figure 3:
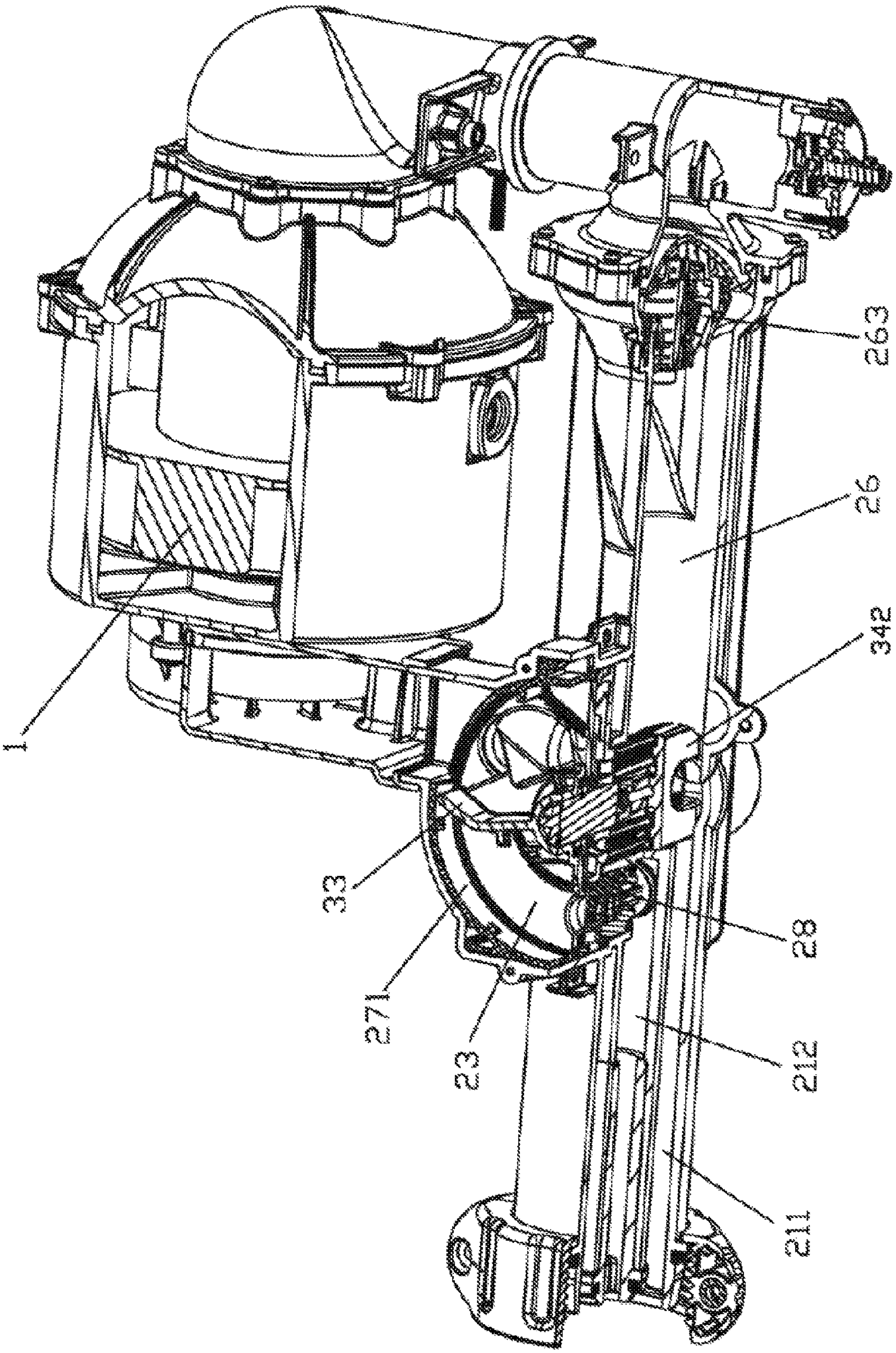
FIG. 3 illustrates a first exemplary the three-dimensional cross-sectional views of the airway device of FIG. 1.
Figure 3A:
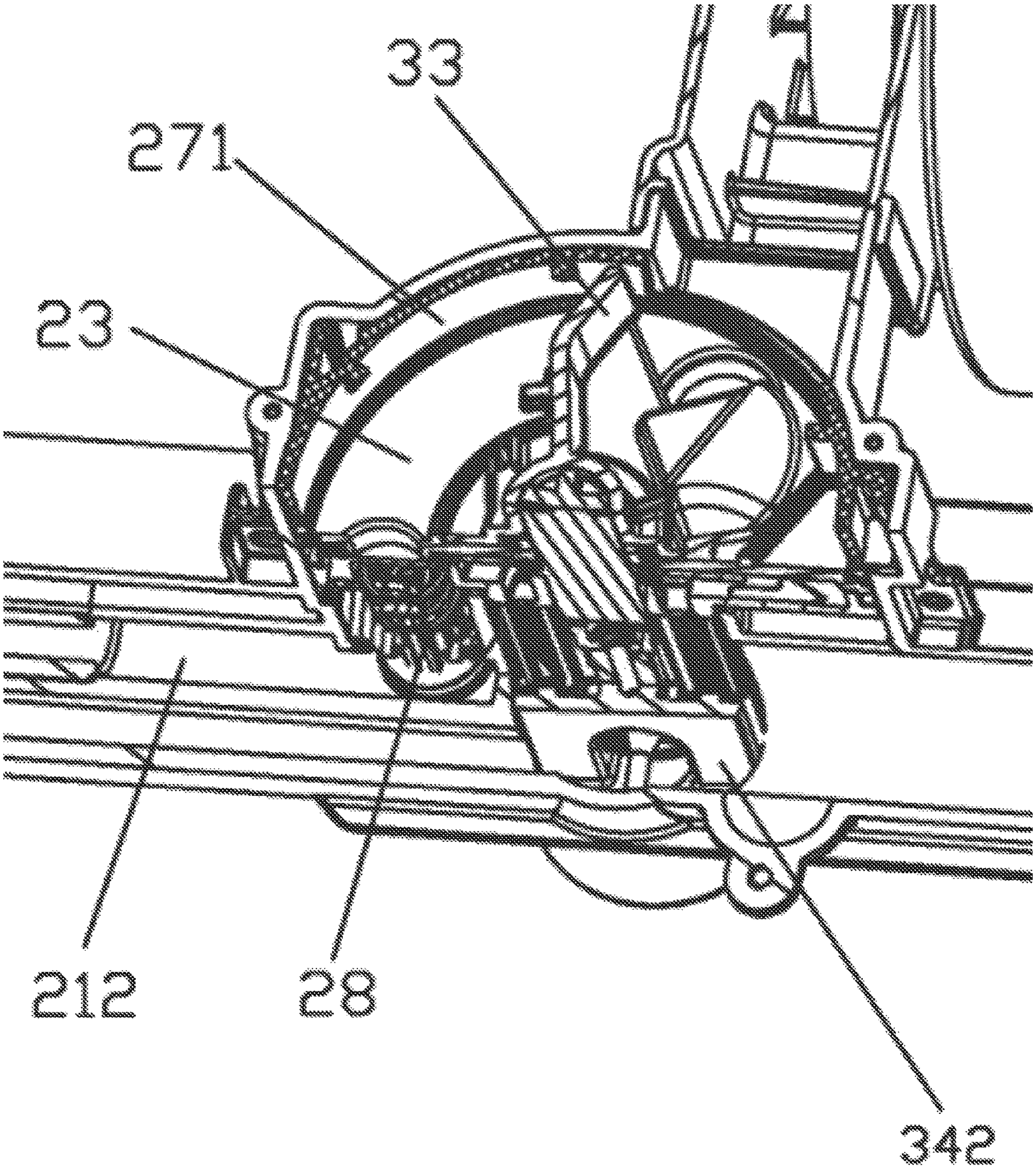
FIG. 3A is a detail view of a portion of FIG. 3.
Figure 4:
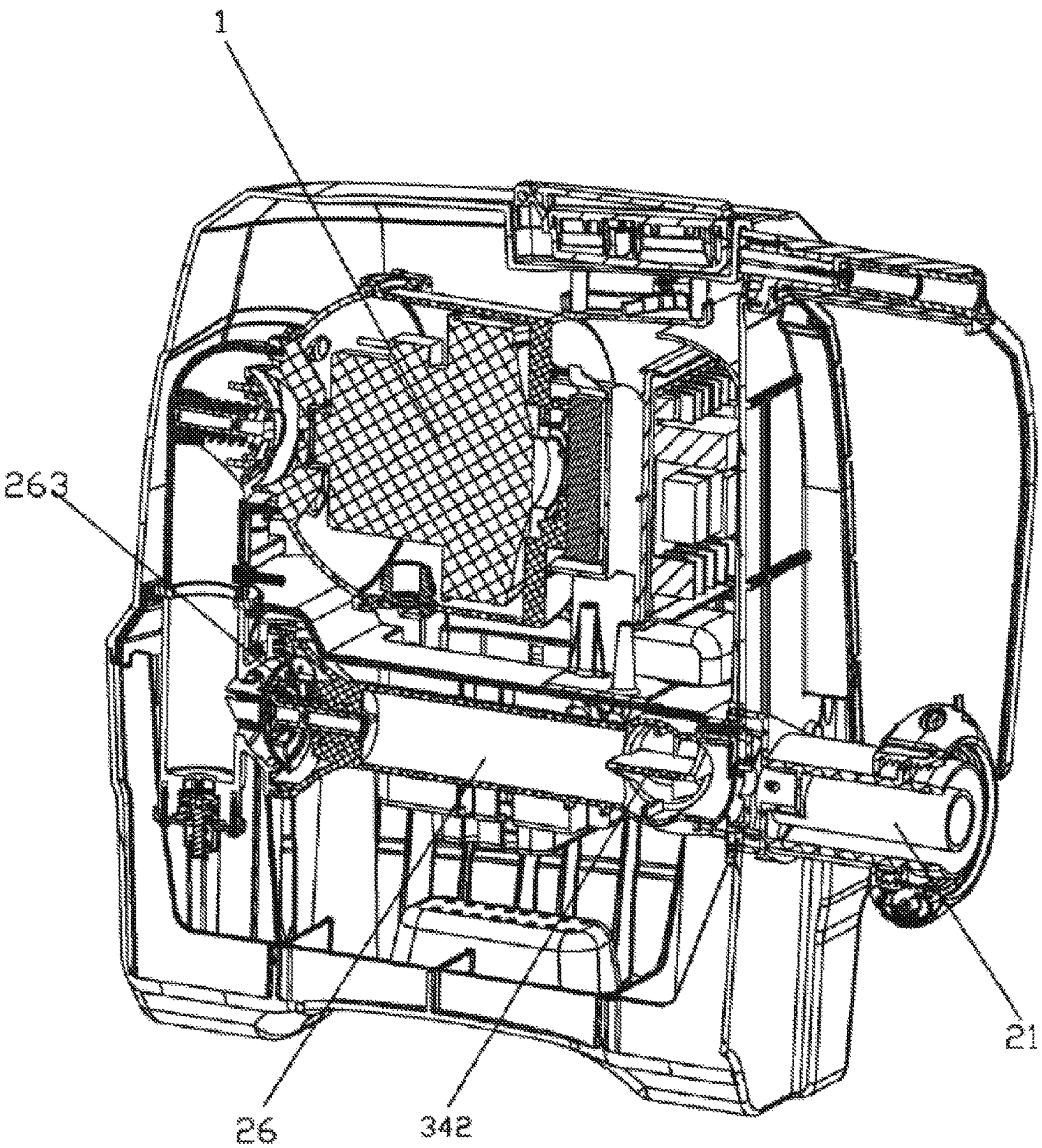
FIG. 4 illustrates a second exemplary perspective sectional view of the airway device of of FIG. 1 positioned within a housing.
Figure 5:
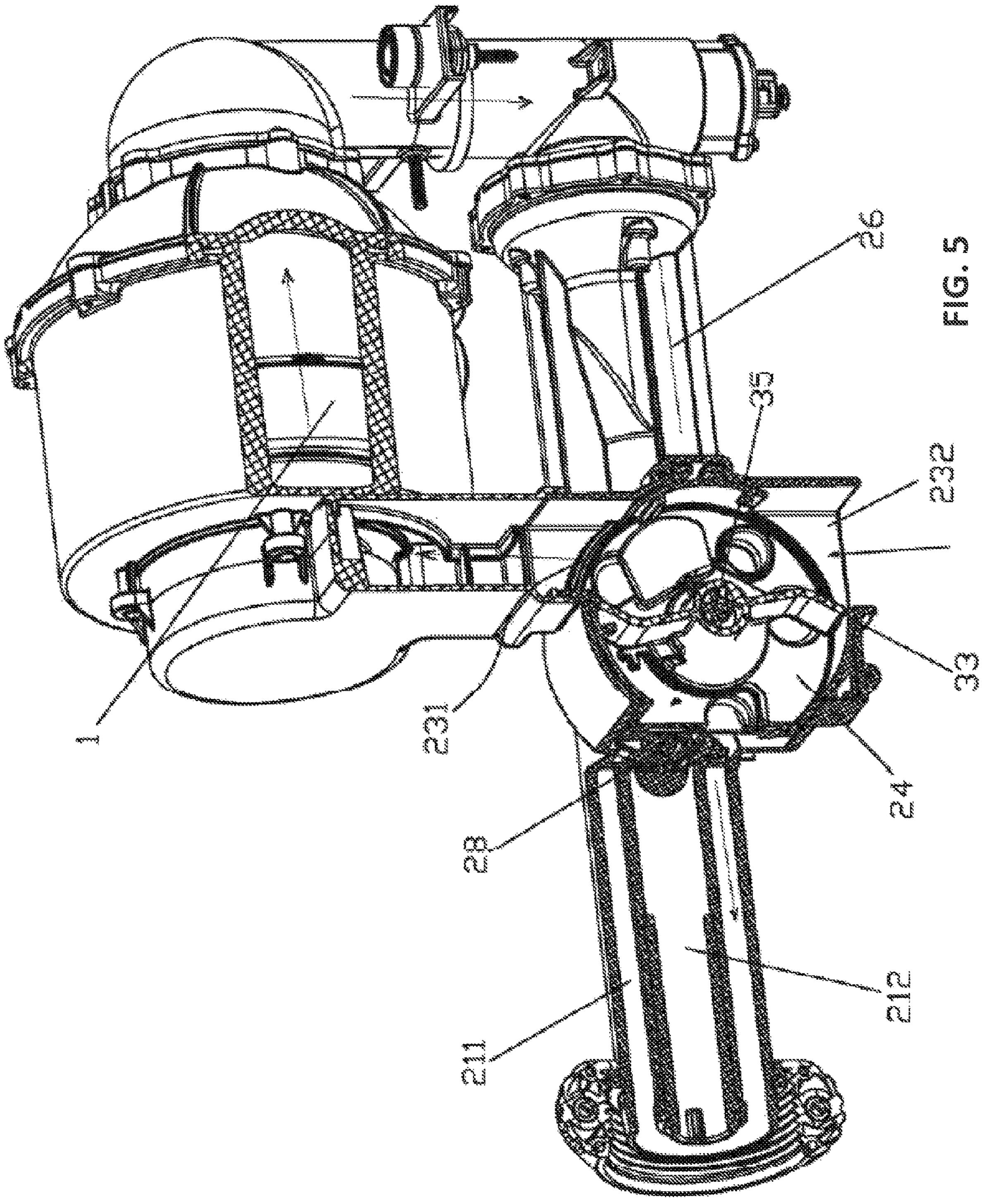
FIG. 5 illustrates a third exemplary three-dimensional cross-sectional view of the airway device of FIG. 1 in a bubbling state.
Figure 6:
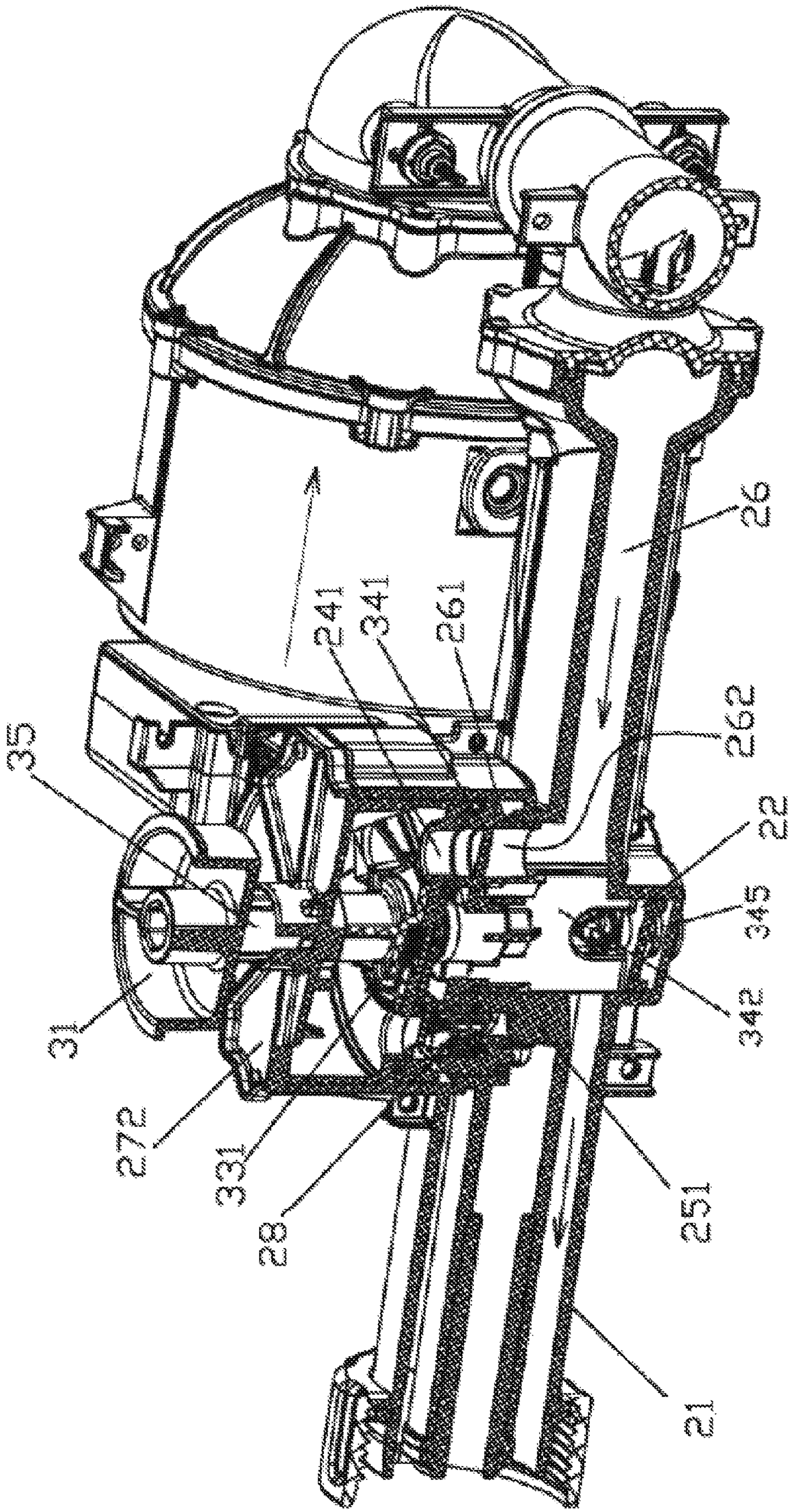
FIG. 6 illustrates a fourth exemplary three-dimensional cross-sectional view of the airway device of FIG. 1 in a bubbling state.
Figure 6A:
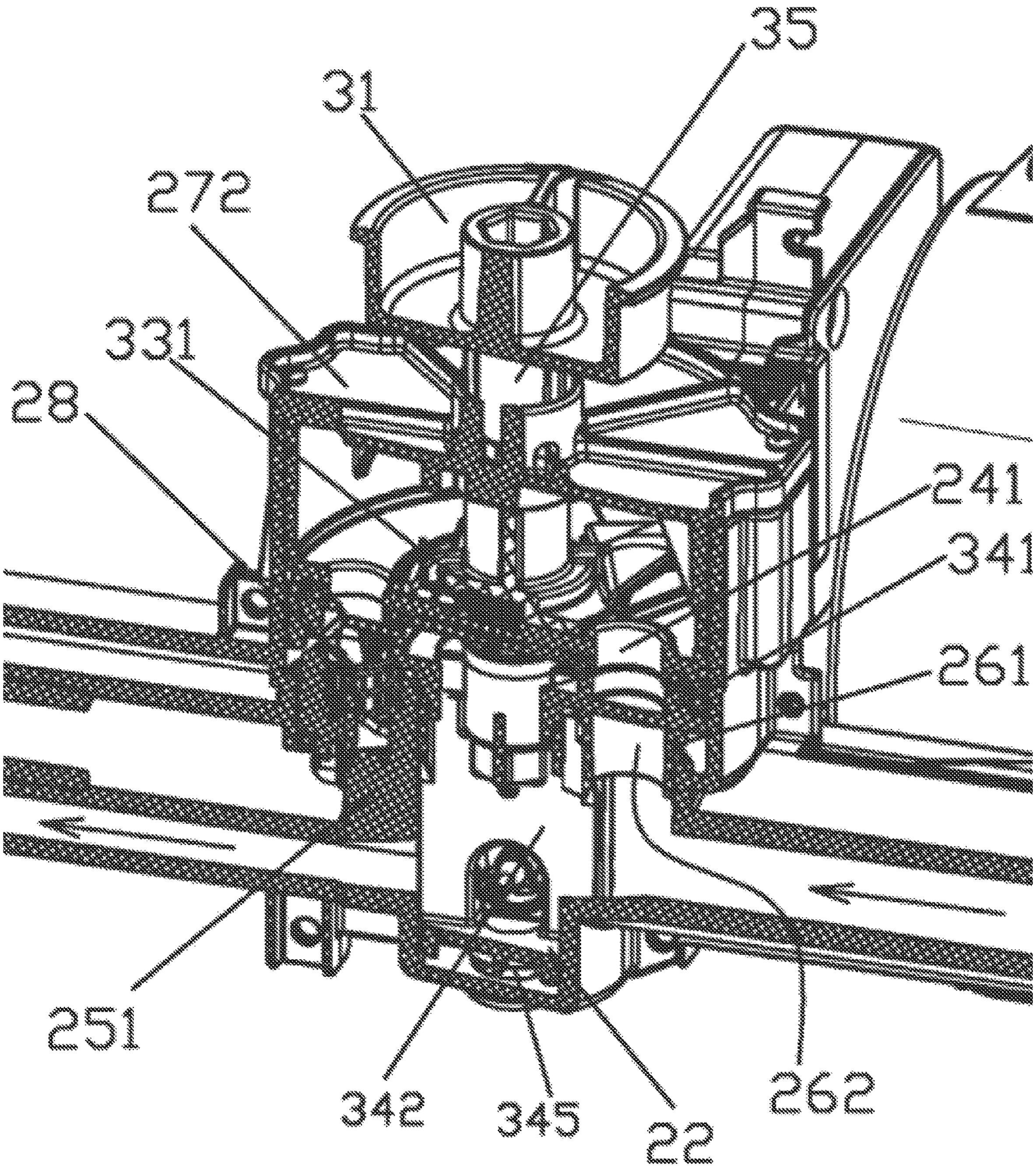
FIG. 6A is a detail view of a portion of FIG. 6.
Figure 7:
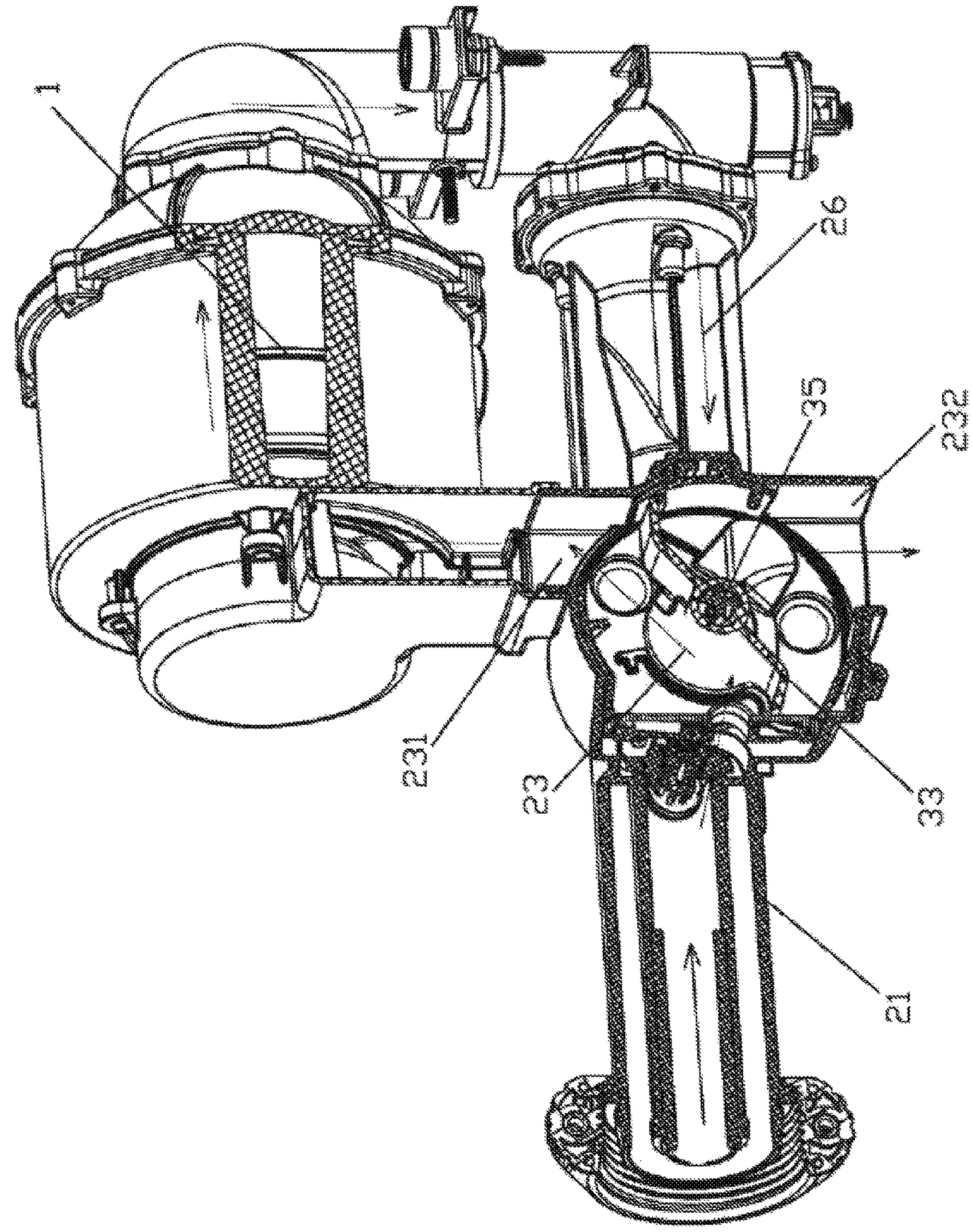
FIG. 7 illustrates the third exemplary three-dimensional cross-sectional view of the airway device of a massage pool of FIG. 1 in an exhaust state.
Figure 8:
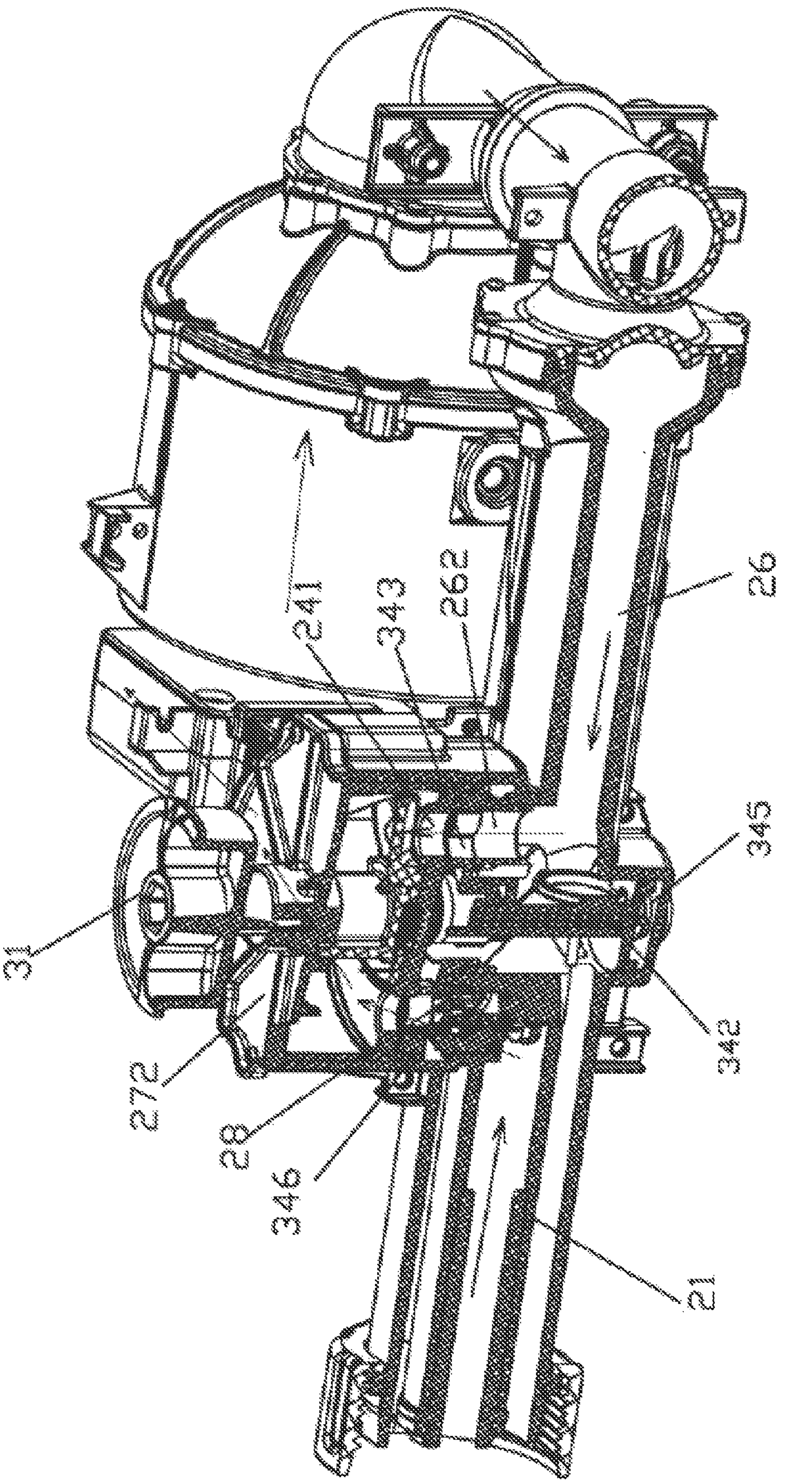
FIG. 8 illustrates the fourth exemplary three-dimensional cross-sectional view of the airway device of FIG. 1 in an exhaust state.
Figure 8A:
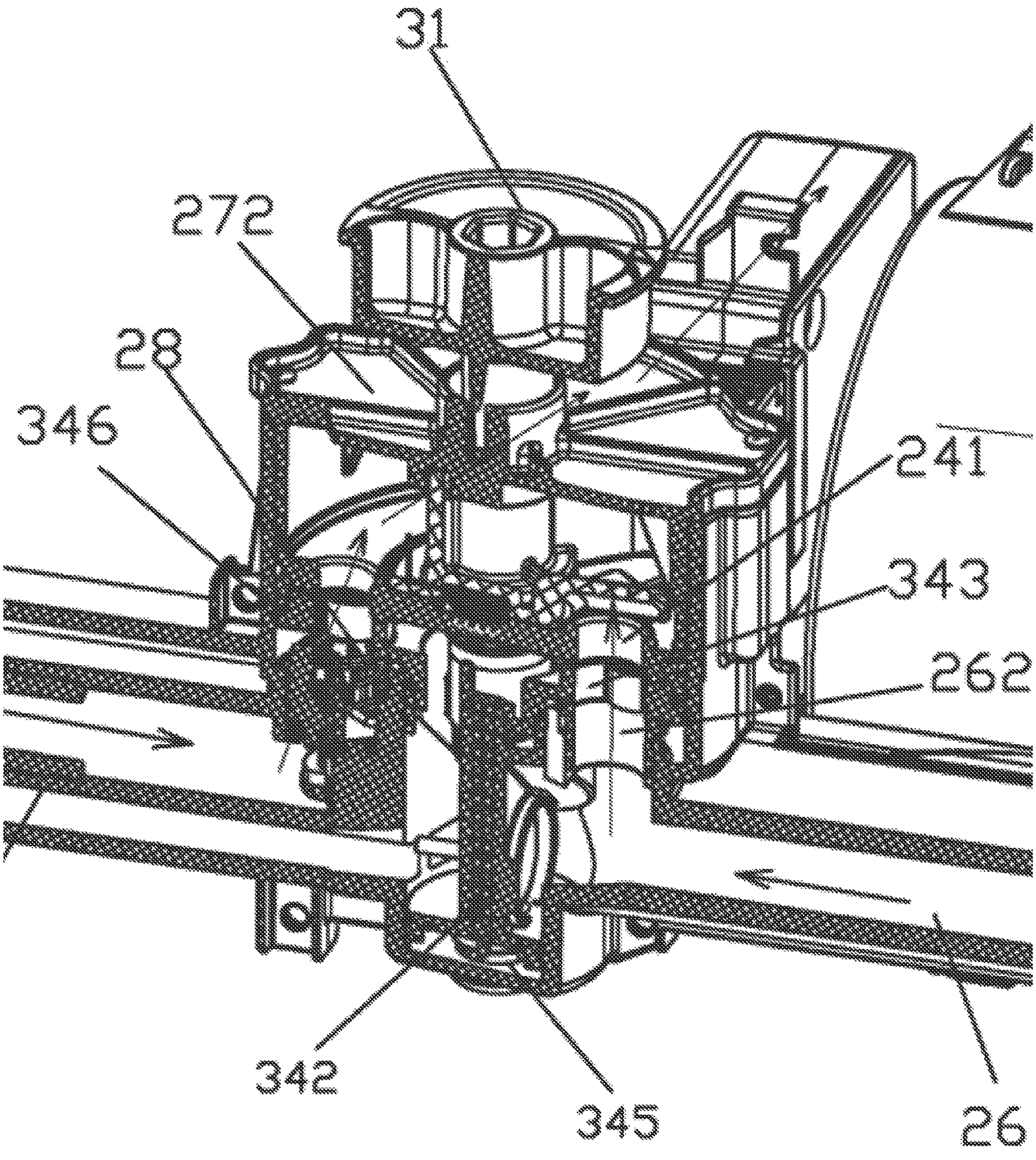
FIG. 8A is a detail view of a portion of FIG. 8.
Figure 9:
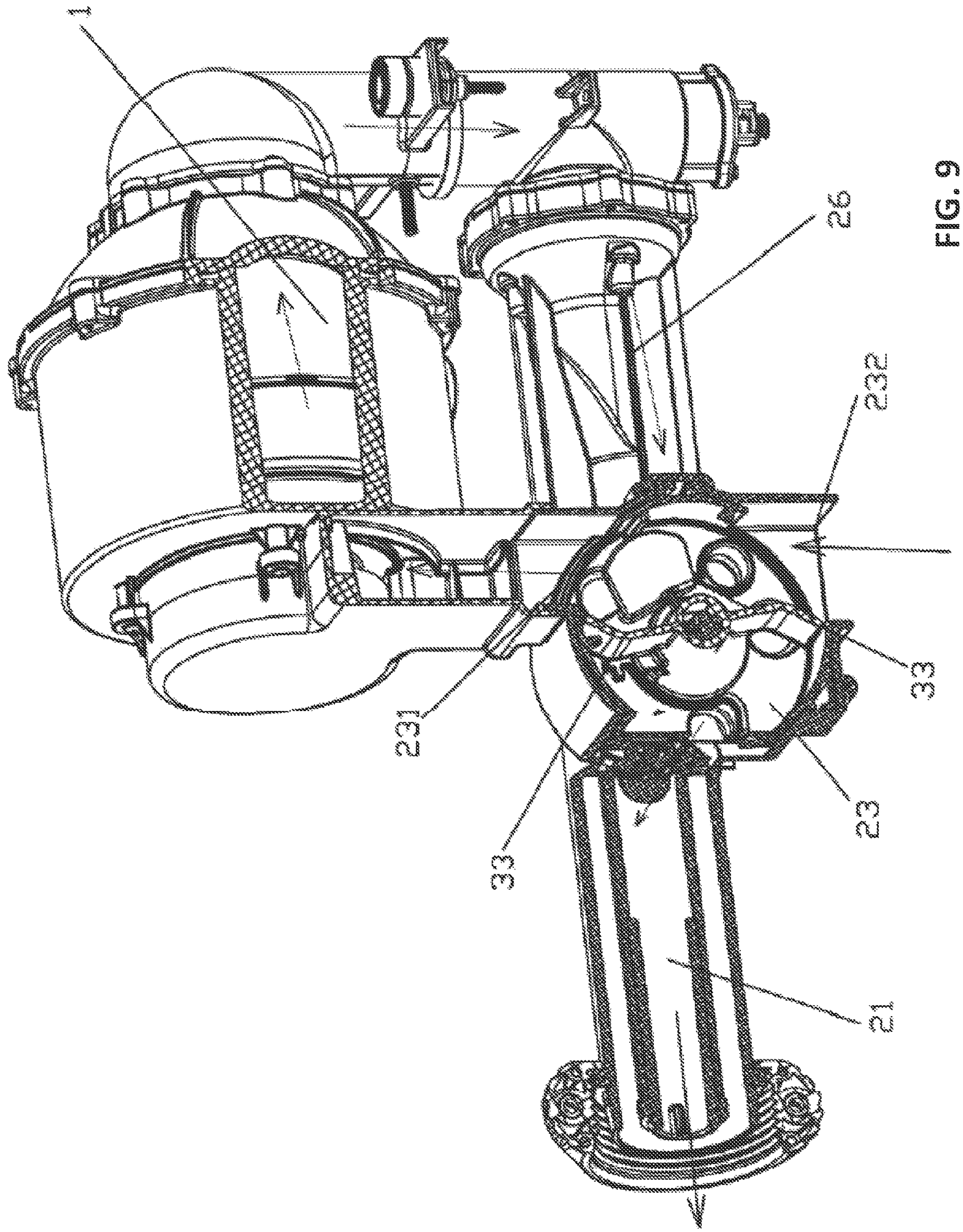
FIG. 9 illustrates the third exemplary three-dimensional cross-sectional view of the airway device of FIG. 1 in an inflating state.

The pipeline 2 is formed with an air connection portion 21. Referring to FIG. 3, the air connection portion 21 has a first air connection passage 211 and a second air connection passage 212. The control mechanism 3 is connected to the pipeline 2. The airway unit 4 is formed with an inner chamber 22 (see FIG. 6) and an outer chamber 23 (see FIG. 3). Referring to FIG. 5, the outer chamber 23 is provided with a connecting port 231 and an outer port 232 that can be connected to the outside world.

The air pump 1 is mounted on the pipeline 2 and is provided between the connecting port 231 and the inner chamber 22. The control mechanism 3 is provided with a ventilation passage 32 of control member 6 (see FIG. 2). Control member 6 includes a first portion 7 and a second portion 8 which cooperate to define air passages, such as the ventilation passage 32. The control mechanism 3 comprises a reversing piece 33, a reversing valve core group 34 and a drive shaft 35. The reversing piece 33 is arranged in the outer chamber 23 and the outer chamber 23 may be divided into independent chambers, such as a first air chamber and a second air chamber. The reversing piece 33 may rotate relative to the pipeline 2 between a connecting position and an isolating position. When the reversing piece 33 is in the connecting position, the first air chamber is connected to the connecting port 231 and the outer port 232 (see FIG. 5). That is, the connecting port 231 and the outer port 232 are connected to each other through the first air chamber. When the reversing piece 33 is in the isolating position, the connecting port 231 and the outer port 232 are located in the two air chambers respectively and are isolated by the reversing piece 33. The reversing valve core group 34 may rotate relative to the pipeline 2 between a first intake position, an exhaust position and a second intake position. The operating member 31 is drivingly connected to the drive shaft 35 to drive the drive shaft 35 to rotate to three positions corresponding to the first intake state (blowing air into the massage pool to achieve massage, such as the bubbling state), the exhaust state (the air chamber of the massage pool is exhausted outward, that is, the exhaust state) and the second intake state (inflating the air chamber of the massage pool, that is the pumping state). The drive shaft 35 is connected to the reversing piece 33 and the reversing valve core group 34 in a drive manner, and drives the reversing piece 33 to rotate between the connecting position and the isolating position through the rotation of the driving shaft 35, and to drive the reversing valve core group 34 to rotate between the first intake position, the exhaust position and the second intake position. The first intake position is located between the exhaust position and the second intake position.

In the first intake state, the reversing piece 33 turns to the connecting position and the reversing valve core group 34 turns to the first intake position, the outer port 232 and the connecting port 231 are connected through the first air chamber and the inner chamber 22 is connected to the first air connection passage 211. The outside air flows into the first air connecting passage through the outer port 232, the first air chamber, the connecting port 231, the air pump 1, the inner chamber 22 and the first air connection passage 211 in sequence to achieve a bubbling state in the massage pool.

In the exhaust state, the reversing piece 33 turns to the isolating position and the reversing valve core group 34 turns to the exhaust position. The connecting port 231 is connected the second air connection passage 212 through the second air chamber of the outer chamber 23, and the outer port 232 is connected to the inner chamber 22 through the first air chamber of the outer chamber 23. The air in the air chamber of the massage pool exhausts out through the second air connection passage 212, the second air chamber, the connecting port 231, the air pump 1, the inner chamber 22, the first air chamber, and the outer port 232.

In the second intake state, the reversing piece 33 turns to the connecting position and the reversing valve core group 34 turns to the second intake position. The outer port 232 is connected to the connecting port 231 through the first air chamber, and the ventilation passage 32 is connected to the inner chamber 22 and the second air connection passage 212, the outside air inflate the second air connection passage to achieve inflation through the outer port 232, the first air chamber, the connecting port 231, the air pump 1, the inner chamber 22, the second inner through hole, the ventilation passage 32, a first inner through hole and the second air connection passage 212. The reversing piece 33, the reversing valve core group 34 and the drive shaft 35 cooperate to form a transmission mechanism. The reversing valve core group 34 is the first movable member, and the reversing piece 33 is the second movable member.

A first elastic body 331 and a limiting structure (which limits the movement area of reversing piece 33) are arranged between the reversing piece 33 and the control member 6. The first elastic body 331 is, for example, a torsion spring and connects the reversing piece 33 and the control member 6. The first portion 7 of the control member 6 includes a second protrusion 333 protruding on the first portion 7 of the control member 6. The reversing piece 33 may abut against the second protrusion 333 to realize the limit (this position is the connecting position) and can be reset to or maintained in the connecting position under the elastic force of the first elastic body 331. The reversing piece 33 is provided with an inner hole that can be sleeved on the drive shaft 35. The inner hole is sleeved on the drive shaft 35, and a transmission structure is arranged between the reversing piece 33 and the drive shaft 35. The drive shaft 35 drives the reversing piece 33 to the isolating position through the transmission structure. The inner peripheral wall of the inner hole of the reversing piece 33 is convexly provided with a first protrusion 332. The drive shaft 35 is concavely provided with a central angle groove 351. The first protrusion 332 is located in the central angle groove 351, and the groove wall of the central angle groove 351 and the first protrusion 332 can abut against each other to form the above-mentioned transmission structure.

The drive shaft 35 and the reversing valve core group 34 are connected in a synchronous rotation, so that when the driving shaft 35 rotates to three positions, the reversing valve core group 34 is respectively driven to rotate to the first intake position, the exhaust position and the second intake position. The outer end of the drive shaft 35 is sealed and rotated out of the outer chamber 23. The operating member 31 is fixedly connected to the protruding outer end of the drive shaft 35. When the operating member 31 is in the middle position, the reversing piece 33 is kept in the connecting position under the action of the first elastic body 331 and the limiting structure, and the reversing valve core group 34 is in the first intake position, at this time in the first intake state (bubbling state). The operating member 31 rotates clockwise and drives the drive shaft 35 to rotate clockwise, after rotating to a preset angle (the preset angle is smaller than the angle of center of circle of the first intake position and the exhaust position), the groove wall 395 (see FIG. 11) of the circle angle groove abuts against the first protrusion 332 and continues to rotate clockwise to drive the reversing piece 33 and the reversing valve core group 34 to rotate clockwise together until the reversing valve core group 34 is in the exhaust position and the reversing piece 33 is in isolation position, at this time, it is in the exhaust state, and can be maintained in this state under the manual action of the user, or a positioning mechanism between the drive shaft 35 and the pipeline 2 can be set to maintain this state, after which the user turns counterclockwise to drive the drive shaft 35 to turn back to the middle position, the reversing piece 33 is reset to the connecting position under the action of the first elastic body. The operating member 31 rotates counterclockwise to drive the drive shaft 35 to rotate counterclockwise to drive the reversing valve core group 34 to rotate to the second intake position, and during the rotating counterclockwise, the central angle groove rotates relative to the first protrusion, so that the reversing piece 34 is stationary and maintained in the connecting position under the action of the first elastic body, at this time, it is in the second intake state. A groove wall of the central angle groove 351 is protruded with abutting protrusion 352, and the abutting protrusion and the first protrusion can abut and cooperate to form the above-mentioned transmission structure. The central angle groove 351 is convexly provided with a reinforcing rib 353 (see FIG. 13) in the middle of the groove bottom, and the end face of the reinforcing rib 353 is set as an outer arc surface. The end face of the first protrusion is provided with an inner arc surface, and the outer arc surface and the inner arc surface are adapted to enhance the strength on one hand and to provide guiding on the other hand.

The pipeline 2 is fixed with a sealing plate 24, and the outer chamber 23 and the inner chamber 22 are separated by the sealing plate 24. The sealing plate 24 is provided with two outer through holes 241. The reversing valve core group 34 comprises a valve core plate 341 and an air baffle plate 342 fixed under the valve core plate 341. The valve core plate 341 is provided with two first inner through holes 343 and a second inner through hole 344. The valve core plate 341 is located under the sealing plate 24 and the ventilation passage 32 formed between the sealing plate 24 and the valve core plate 341 is connected to the second inner through hole 344 and a first inner through hole, and the second inner through hole is formed by a concavity on the peripheral wall of the inner hole of the valve core plate 341. The two outer through holes 241 and the two first inner through holes 343 are matched and controlled by the rotation of the reversing valve core group 34 to be aligned and connected at the exhaust position or staggered and closed at the first and second intake positions. Portion 8 of control plate 2 is rotatable relative to portion 7. When the inner chamber 22 cooperates with the air baffle plate 342 and the reversing valve core group 34 is in the first intake position, the inner chamber 22 and the first air connection passage 211 are connected. When the reversing valve core group 34 is in the second intake position and the exhaust position, the inner chamber 22 and the first air connection passage 211 are isolated by the air baffle plate 342; the second air connection passage 212 in the exhaust position, a first inner through hole 343, an outer through hole 241 (a first inner through hole 343 and an outer through hole 241 are aligned), the second air chamber and the connecting port 231 are sequentially connected to the inner chamber 22, the other first inner through hole 343, the other outer through hole 241 (the other first inner through hole 343 and the other outer through hole 241 are aligned), the first air chamber and the outer through hole 232. The ventilation passage 32 at the second intake position is respectively connected to the inner chamber 22 and the second air connection passage 212 through the second inner through hole 344 and the two first inner through holes 343. In embodiments, the valve core plate 341 and the sealing plate 24 face and abut. The valve core plate 341 is concavely provided with a groove on the abutment end face, and the second inner through hole 344 is set at the bottom of the groove. As the sealing plate 24 is sealed and contacted with the valve core plate 341, a connecting chamber is formed at the groove between the sealing plate and the valve core plate, and the connecting chamber constitutes the ventilation passage 32. In the second intake state, the upper port of the two first inner through holes 343 and the sealing plate are spaced arranged (specifically, a gap groove is recessed on the bottom surface of the sealing plate, and the upper port of the first inner through hole is connected to the connecting chamber through the gap groove when it is in the second intake state), and the two first inner through holes 343 are all connected to the connecting chamber. The inner chamber is further provided with a C-shaped groove body 3431. The lower port of the first inner through hole at the second intake position is connected to the upper port of the groove body, and the second air connection passage 212 is connected to the upper port of the groove body. The air connection port is connected to the groove body, and the air in the first inner through hole enters the air connection port through the groove body. When the reversing valve core group 34 is in the first and second intake positions, the abutting end face of the valve core plate 341 and the outer through hole 241 are sealed and matched. The drive shaft 35 passes through the sealing plate 24 and is fixed to the valve core plate 341. The sealing plate constitute the fixing plate.

The pipeline 2 has an air connection section 25, a connecting section 26 and a middle section 27 between the air connection section 25 and the connecting section 26. The air connection section 25 has a pipe-in-pipe structure and the inner pipe constitutes the second air connection passage 212 and the gap between the inner and outer pipes constitute the first air connection passage 211. The upper edge of the middle section 27 extends upward to form a peripheral wall 271. The upper port of the peripheral wall 271 is fixed with a cover plate 272. The sealing plate 24 is fixed in the peripheral wall 271 and the outer chamber 23 is formed in the peripheral wall 271 and between the sealing plate 24 and the cover plate 272. The inner chamber 22 is formed in the middle section 27 and under the sealing plate 24. The peripheral wall 271 is provided with the connecting port 231 and the outer through port 232. The connecting section 26 is connected to the connecting port 231 and the air pump 1 is arranged in the connecting section 26. Further, the air connection section 25 is fixedly provided with a first connecting base 251 protruding into the middle section 27. The upper end face of the first connecting base 251 is provided with an air connection port for connecting to the second air connection passage 212 of the inner pipe and the first connecting base 251 seals the middle and upper part of the gap between the inner and outer pipes. The groove body 3431 (see FIG. 10) is provided on the upper end face of the first connecting base 251. The connecting section 26 is fixedly provided with a second connecting base 261 protruding into the middle section 27. The second connecting base 261 is provided with a through hole 262 penetrating up and down. The inner chamber 22 is connected to the lower part of the gap between the inner and outer pipes and the connecting section 26. The valve core plate 341 abuts on the first connecting base 251 and the second connecting base 261, the through hole 262 can be matched with the first inner through hole (aligned and connected in the exhaust state, sealed and staggered in the first and second intake states), and the air connection port can be matched with the first inner through hole. The outer end of the drive shaft protrudes from the cover plate 272 in a sealing manner. The operating member 31 is fixed on the protruding outer end of the drive shaft 35. A check valve 263 is provided between the air pump of the connecting section 26 and the inner chamber. In embodiments, the first connection base and the second connection base are connected together and are provided with the above-mentioned groove body.

Figure 10:
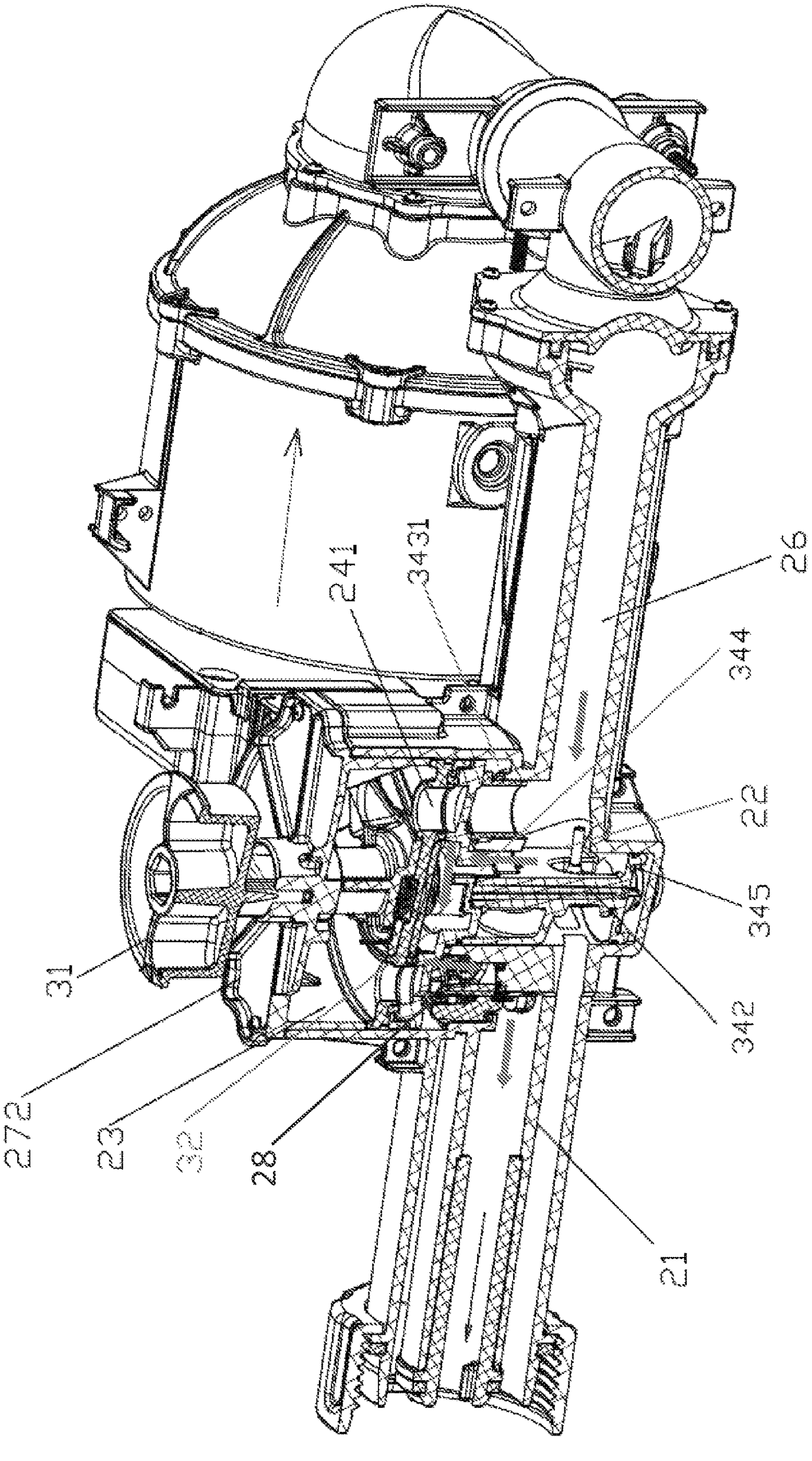
FIG. 10 illustrates the fourth exemplary three-dimensional cross-sectional view of the airway device of FIG. 1 in an inflating state.
Figure 10A:
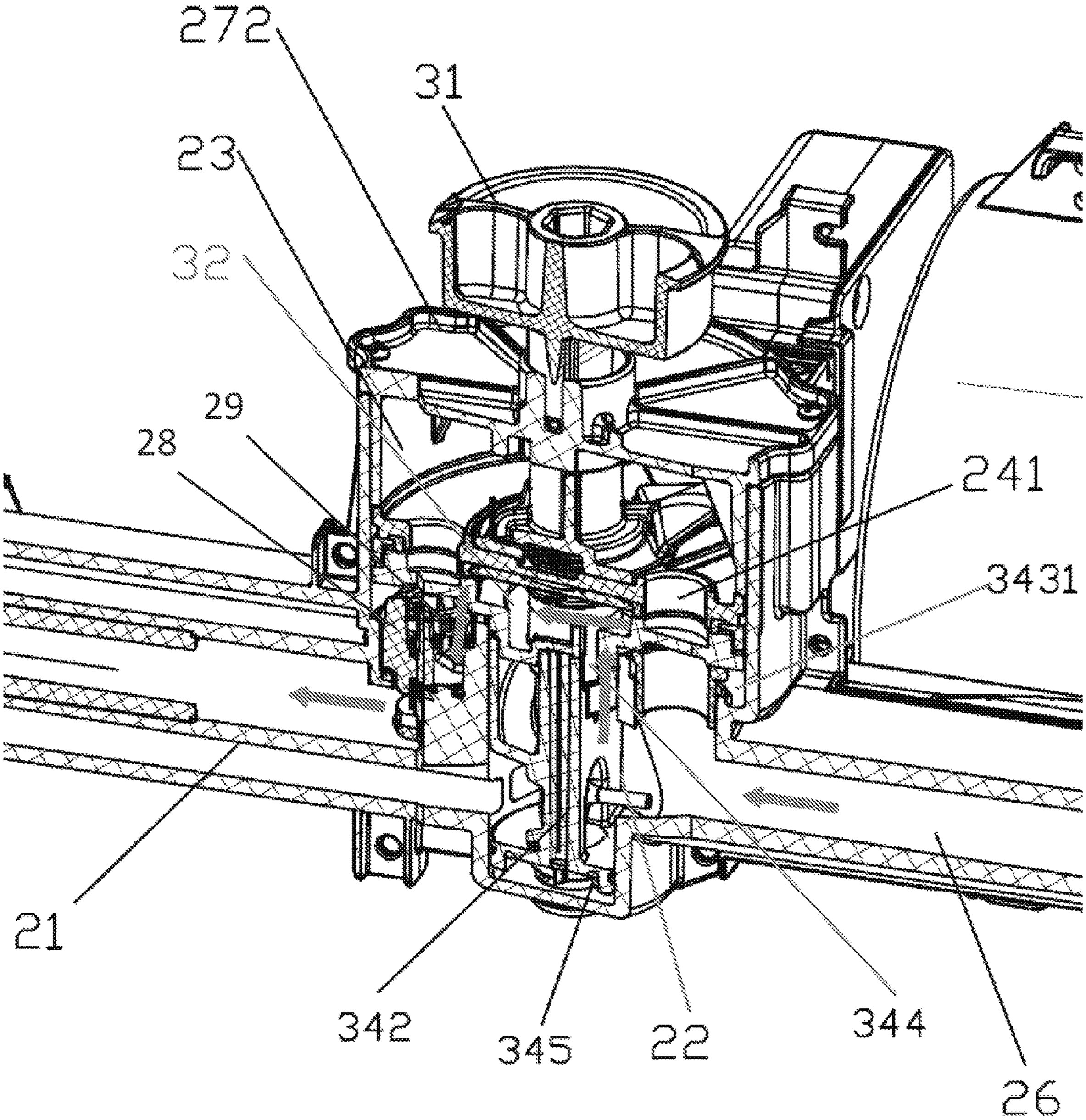
FIG. 10A is a detail view of a portion of FIG. 10.
Figure 11:
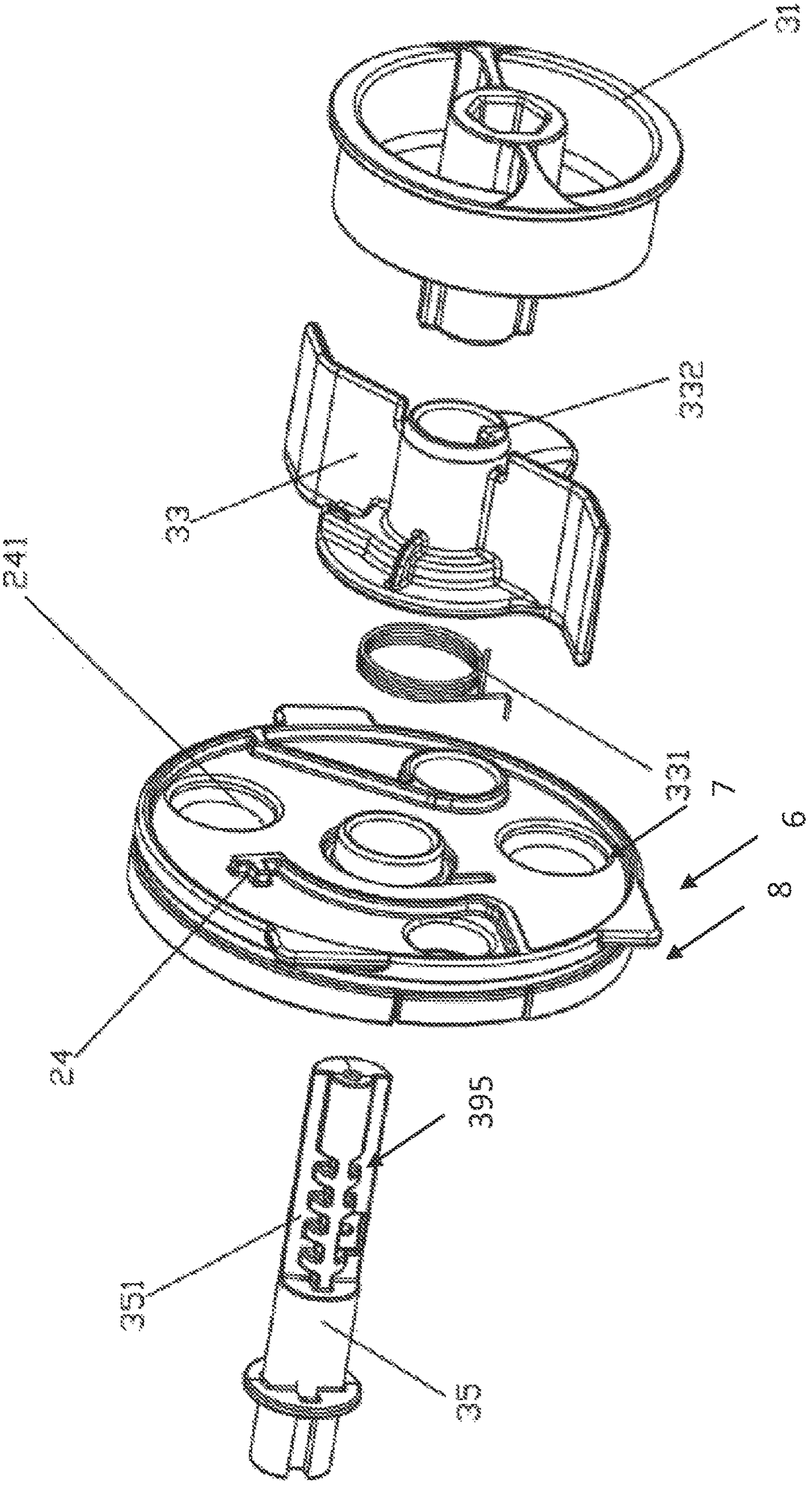
FIG. 11 illustrates a schematic exploded view of an exemplary control device of the airway device of FIG. 1.
Figure 12:
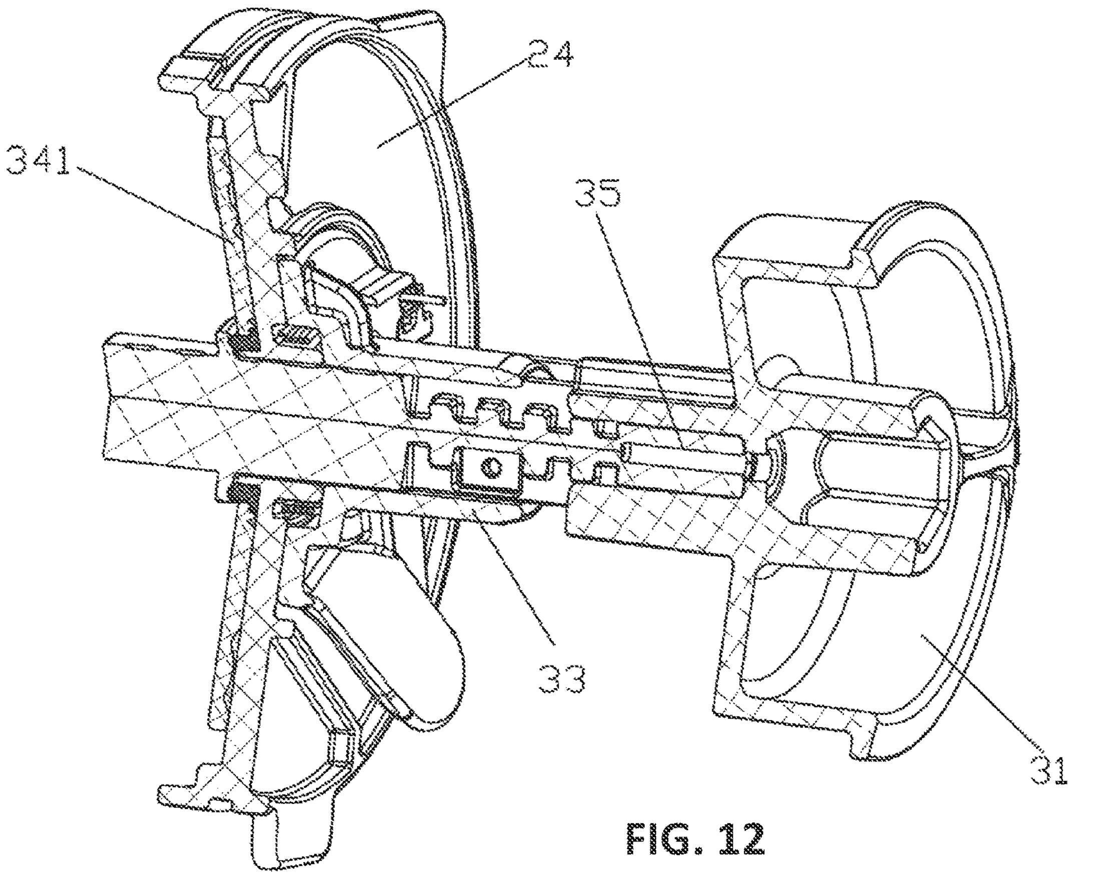
FIG. 12 illustrates a schematic cross-sectional view of the control device of FIG. 11.
Figure 13:
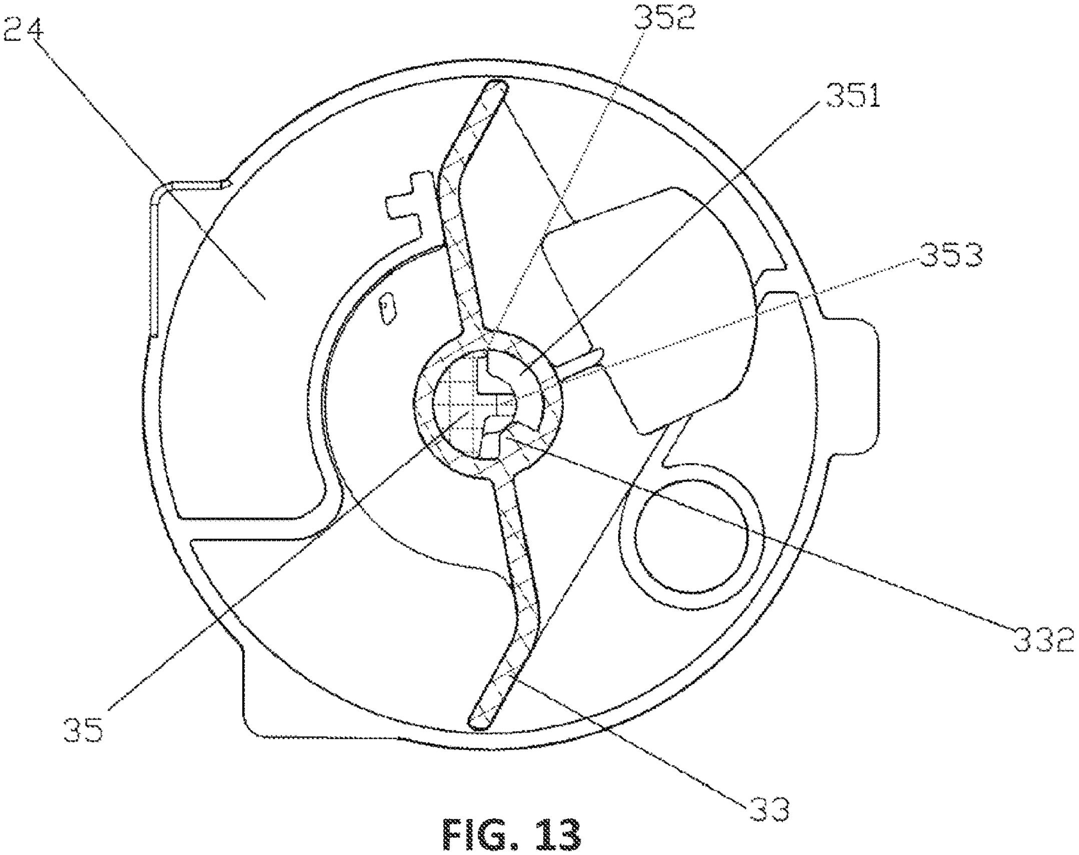
FIG. 13 illustrates a schematic cross-sectional view of the control device of FIG. 11 in a bubbling state.
Figure 14:
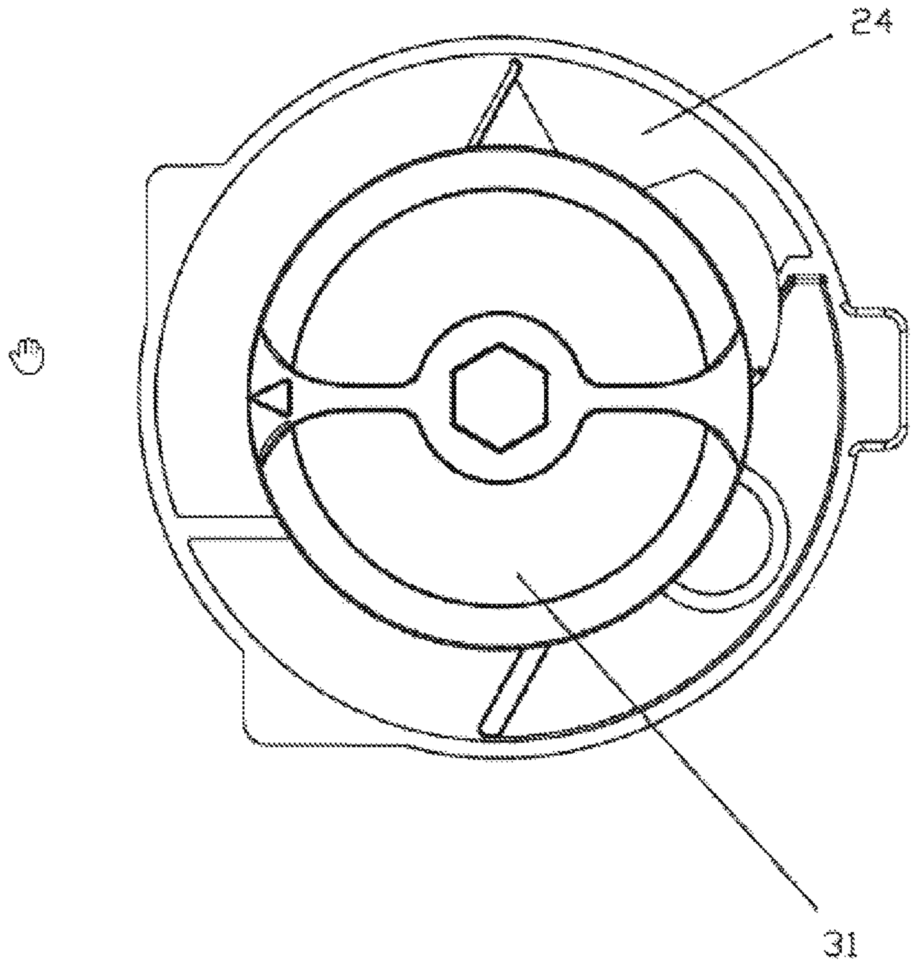
FIG. 14 illustrates a schematic top view of the control device of FIG. 11 in a bubbling state.
Figure 15:
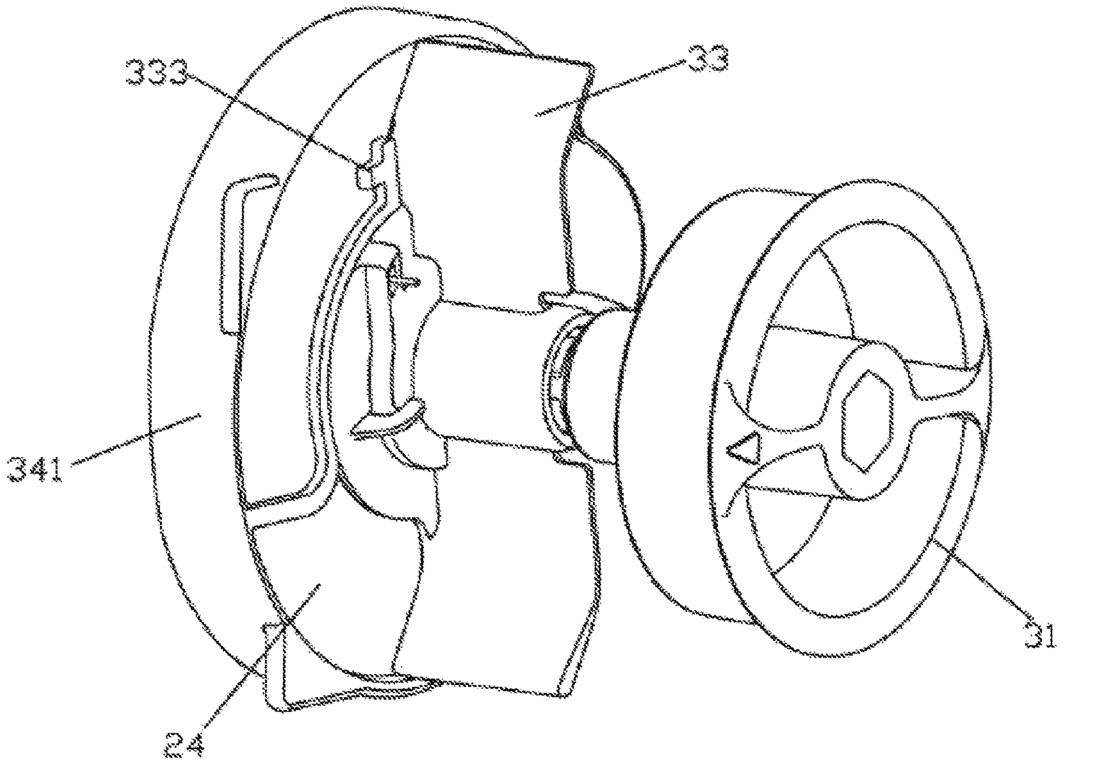
FIG. 15 illustrates a schematic perspective view of the control device of FIG. 11 in a bubbling state.
Figure 16:
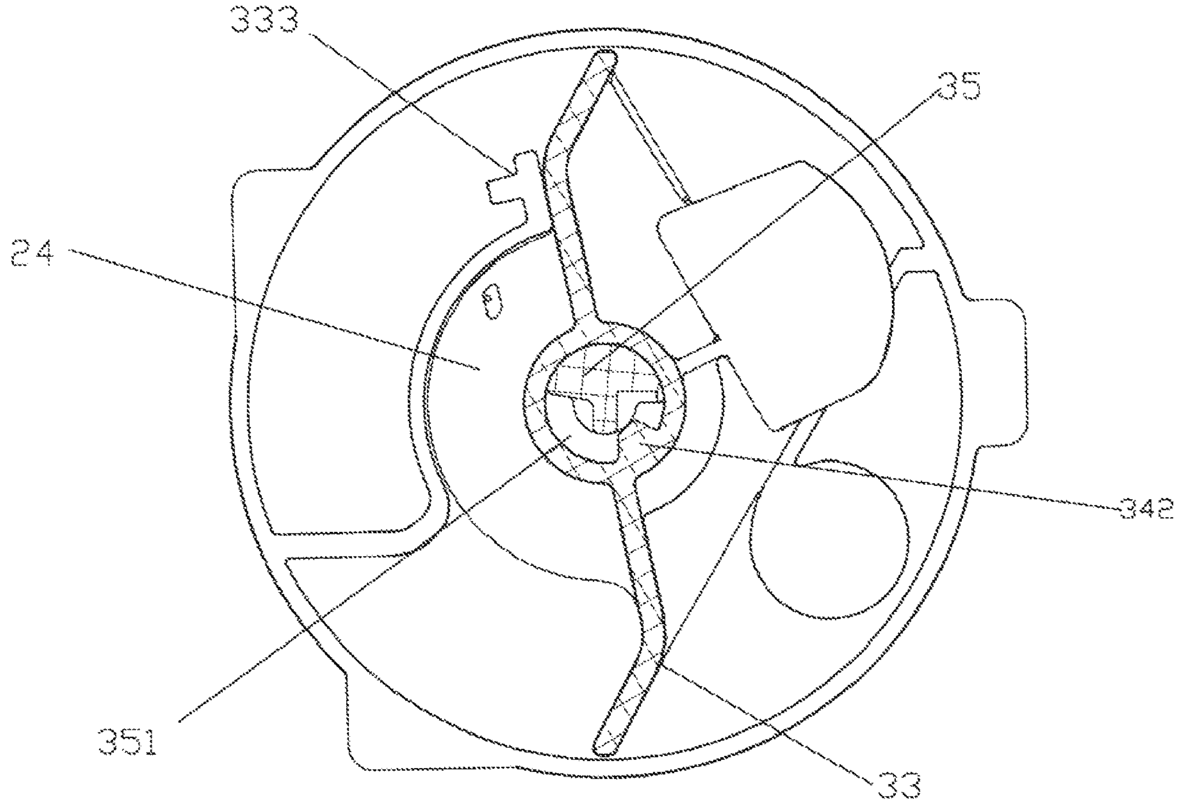
FIG. 16 illustrates a schematic cross-sectional view of the control device of FIG. 11 in an exhaust state.
Figure 17:
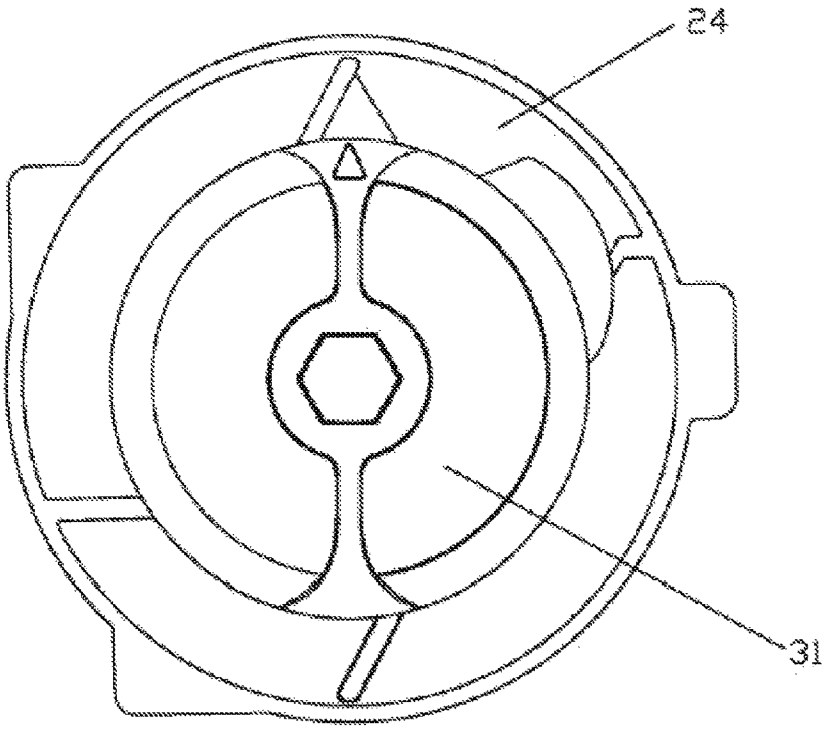
FIG. 17 illustrates a schematic plan view of the control device of FIG. 11 in the exhaust state.
Figure 18:
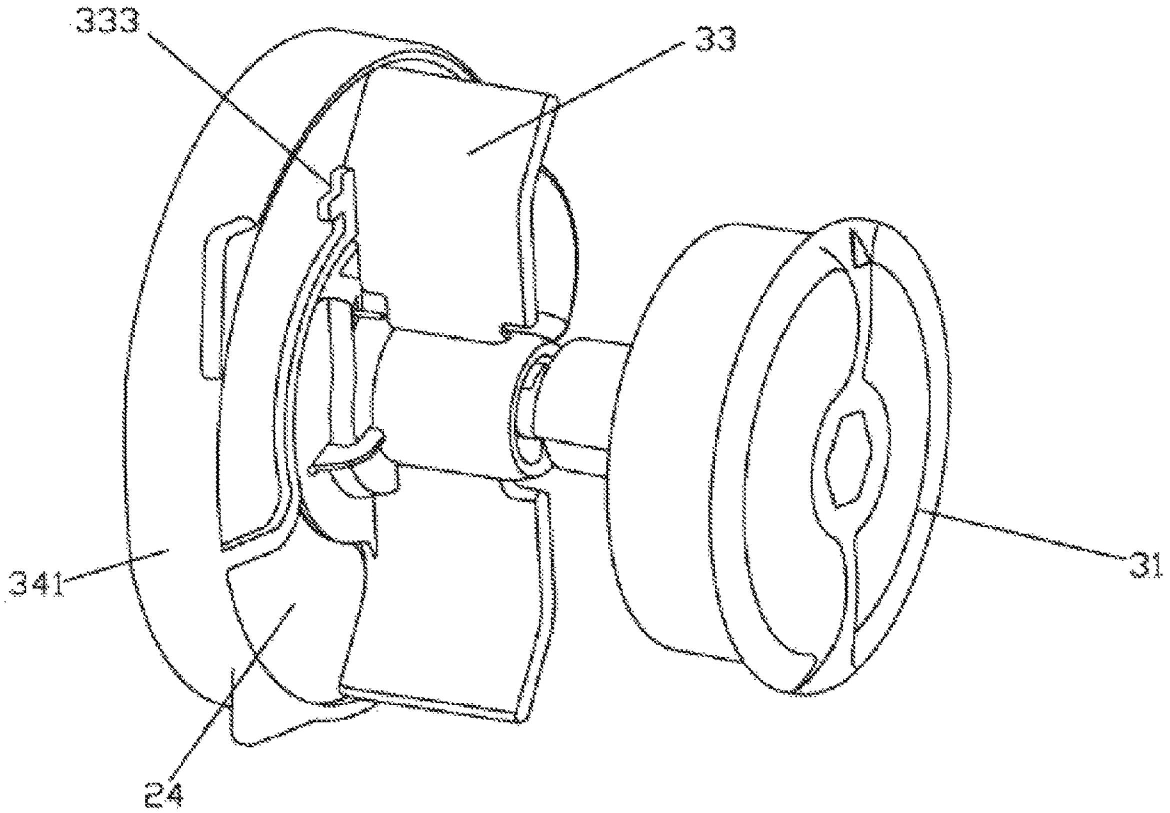
FIG. 18 illustrates a schematic perspective view of the control device of FIG. 11 in the exhaust state.
Figure 19:
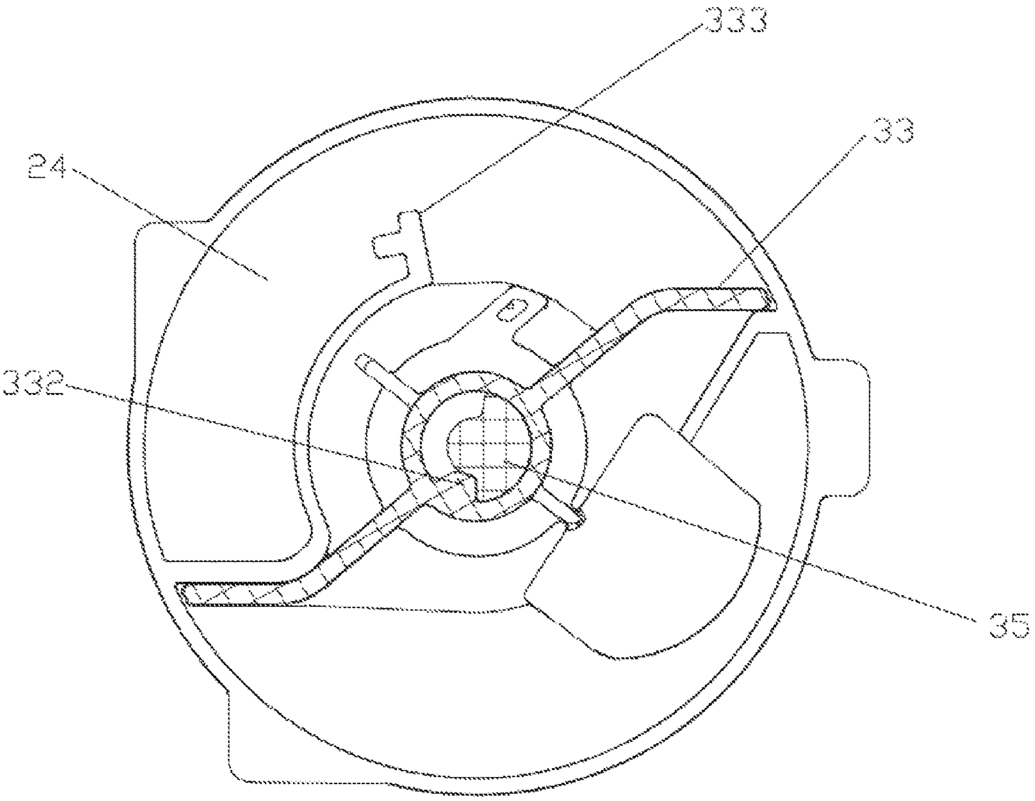
FIG. 19 illustrates a schematic cross-sectional view of the control device of the specific embodiment in an inflating state.
Figure 20:
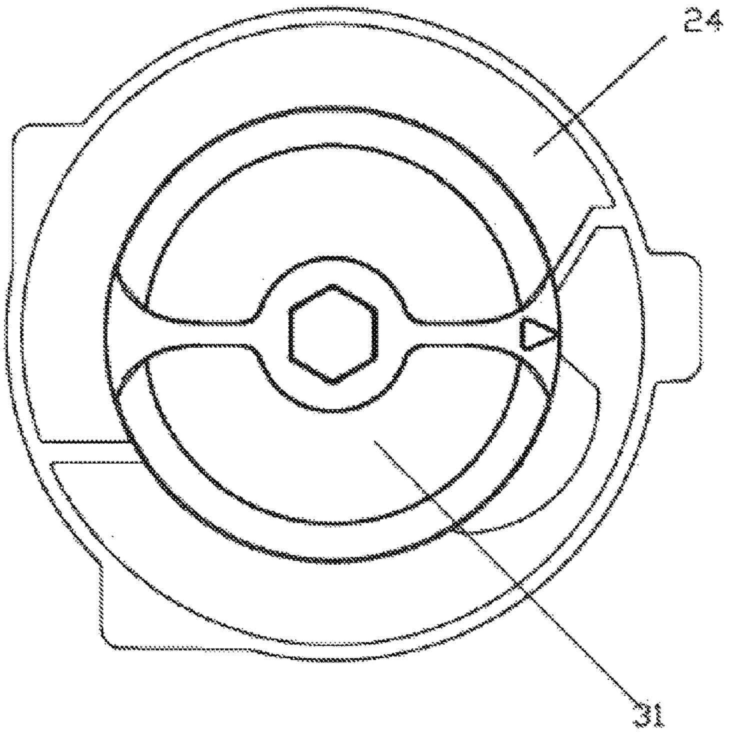
FIG. 20 illustrates a schematic top view of the control device according to the specific embodiment in an inflating state.
Figure 21:
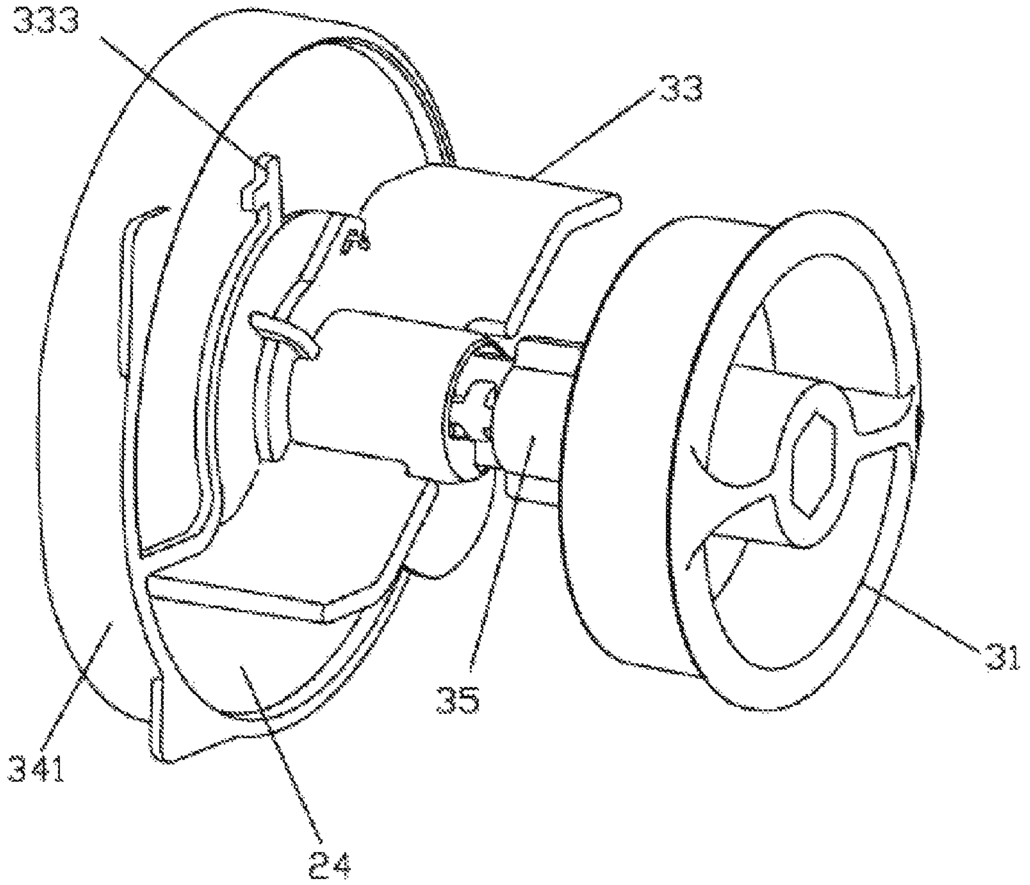
FIG. 21 illustrates a schematic perspective view of the control device according to the specific embodiment in an inflating state.

A control valve 28 (see FIG. 3) is provided at the concave air connection port of the first connecting base 251. The control valve 28 may be changed between a uni-directional state and an open state. The peripheral part of a first inner through hole of the valve core plate 341 extends downward with an abutting convex base 346 to make the bottom surface of the valve core plate 341 formed with the abutting convex base 346 and the remaining area. The bottom surface of the valve core plate 341 is matched with the control valve 28, and is controlled to be in the open state or the uni-directional state by whether the pressing convex base 346 abuts against the control valve 28. When the reversing valve core group 34 is in the exhaust position, the abutting convex base 346 abuts against the control valve 28 to keep the control valve 28 in the open state, and the air in the air chamber is exhausted out to the outside through the control valve, the first inner through hole, etc. When in the first and second intake positions, the remaining areas cooperate with the control valve 28 to make the control valve 28 in the uni-directional state (check valve). In the second intake positon, the outside air enters the air connection port through the second inner through hole and uni-directional open the control valve to pump air to the second air connection passage. The control valve 28 comprises a plug that can be movably connected up and down in the air connection port and a third elastic body 29 arranged in the air connection port. The third elastic body 29 pushes the plug from the inside to the outside, and the plug can move between an open position and the close position relative to the air connection port. The plug abuts against the bottom surface of the valve core plate. When the abutting convex base 346 cooperates with the control valve 28, the abutting convex base 346 can abut the plug of the control valve 28 to position the control valve 28 in an open position (see FIG. 10A). When the remaining area cooperates with the control valve 28 and in the second intake position, the outside air drives the plug to slide down to the open position through the first inner through hole, so that the outside air is pumped to the second air connection passage through the control valve. When there is no outside air or the outside air pressure is small, the control valve is in the close position. The above structure can satisfy that the control valve is in the open state in the exhaust state and in the uni-directional state in other states (comprising the pumping state), thereby improving the pumping and exhaust performance.

A second elastic body 345 is disposed between the air baffle plate 342 and the middle section 27. The second elastic body 345 is sleeved on the air baffle plate 342 and abuts against the bottom of the inner chamber of the middle section 27 and protrudes on the flange of the air baffle plate 342. The second elastic body 345 may make the valve core plate seal against the sealing plate to enhance the sealing performance. Secondly, when the operating member rotates, the reversing valve core group may be moved downward by pressing the operating member to reduce the friction between the valve core plate and the sealing plate. Thirdly, second elastic body 345 may increase the operating feel.

The massage pool comprises a pool body and the airway device of a massage pool. The pool body surrounds to form a pool chamber. The pool body is provided with a first air connection port that is connected to the pool chamber. The pool body is formed with an air chamber and has a second air connection port connected to the air chamber. The first air connection passage and the second air connection passage are respectively connected to the first air connection port and the second air connection port.

In embodiments, the concave air connection port of the first connecting base 251 is provided with a control valve 28, and the control valve 28 may be changed in a uni-directional state and an open state. The peripheral parts of the two first inner through holes of the valve core plate 341 are extended downward to form abutting convex base 346 so that the bottom surface of the valve core plate 341 has two abutting convex bases 346 and the remaining area, the bottom surface of the valve core plate 341 is matched with the control valve 28, and it is in an open state or a uni-directional state according to whether the abutting convex base 346 abuts against the control valve 28 or not. When the reversing valve core group 34 is in the exhaust position and the second intake position, the abutting convex base 346 abuts and compresses the control valve 28 to keep the control valve 28 in the open state. When it is in the first intake position, the remaining area cooperates with the control valve 28 to make the control valve 28 in the uni-directional state (check valve).

EXAMPLES

Example 1. An airway device of a massage pool may comprise an air pump and an airway unit. The airway unit may comprise an operating member; a pipeline, and a control mechanism. The pipeline may be formed with an air connection portion. The air connection portion may have a first air connection passage and a second air connection passage. The air pump may be attached to the pipeline. The control mechanism may be coupled on the pipeline. The operating member may be connected to the control mechanism in a driving manner. The operating member and the control mechanism may cooperate to control the airway unit to change to a first intake state in which the first air connection passage is inflated by the air pump, an exhaust state in which the second air connection passage is exhausted by the air pump, and a second intake state in which the second air connection passage is inflated by the air pump.

Example 2. The airway device of a massage pool according to Example 1, wherein the airway unit may be formed with an inner chamber and an outer chamber. The outer chamber may be provided with a connecting port and an outer port which may be connected to the outside. The air pump may be arranged between the connecting port and the inner chamber. The control mechanism may be provided with a ventilation passage. In the first intake state, the outer port may be connected to the connecting port and the inner chamber may be connected to the first air connection passage. In the exhaust state, the connecting port and the second air connection passage may be connected through the outer chamber and the outer port may be connected to the inner chamber. In the second intake state, the outer port and the connecting port may be connected and the ventilation passage may be connected to the inner chamber and the second air connection passage.

Example 3. The airway device for a massage pool according to Example 2, wherein the control mechanism may comprise a reversing piece and a reversing valve core group. The reversing piece may be rotatable relative to the pipeline at a connecting position wherein the connecting port may be connected to the outer port and an isolating position where the connecting port may be isolated from the outer port. The reversing valve core group may be rotatable relative to the pipeline between a first intake position, an exhaust position and a second intake position. In the first intake state, the reversing piece turns to the connecting position and the reversing valve core group turns to the first intake position. In the exhaust state, the reversing piece turns to the isolating position and the reversing valve core group turns to the exhaust position. In the second intake state, the reversing piece turns to the connecting position and the reversing valve core group turns to the second intake position. The operating member may be connected to the reversing piece and the reversing valve core in a drive manner and may drive the reversing piece and the reversing valve core group to rotate.

Example 4. The airway device for a massage pool according to Example 3, wherein the first intake position of the reversing valve core group may be located between the exhaust position of the reversing valve core group and the second intake position of the reversing valve core group.

Example 5. The airway device of a massage pool according to Example 3, wherein the control mechanism may further comprise a drive shaft. The operating member may be connected to the drive shaft to drive the drive shaft to rotate to three positions respectively corresponding to the first intake state, the exhaust state and the second intake state. The drive shaft may be connected to the reversing piece and the reversing valve core group in a drive manner and may drive the reversing piece to rotate between the connecting position and the isolating position through the rotation of the driving shaft, and may drive the reversing valve core group to rotate between the first intake position, the exhaust position, and the second intake position.

Example 6. The airway device of a massage pool according to Example 5, wherein a first elastic body and a limiting structure may be arranged between the reversing piece and the pipeline. The reversing piece may be controlled by the cooperation of the first elastic body and the limiting structure to be reset to or maintained in the connecting position. The reversing piece may be sleeved on the drive shaft. A transmission structure may be arranged between the reversing piece and the drive shaft. The drive shaft may drive the reversing piece to the isolating position through the transmission structure. The drive shaft and the reversing valve core group may be synchronously rotated and connected.

Example 7. The airway device for a massage pool according to Example 6, wherein the reversing piece may be capable of being sleeved on the inner hole of the driving shaft. The inner peripheral wall of the inner hole may be protrudingly provided with a protrusion. The driving shaft may be concavely provided with a central angle groove. The protrusion may be located in the central angle groove. The groove wall of the central angle groove and the protrusion can abut and cooperate to form the above-mentioned transmission structure.

Example 8. The airway device of a massage pool according to Example 4, wherein the pipeline may be fixed with a sealing plate. The outer chamber and the inner chamber may be separated by the sealing plate. The sealing plate may be provided with two outer through holes. The reversing valve core group may comprise a valve core plate and an air baffle plate that may be fixedly connected to each other. The valve core plate may be provided with two first inner through holes and a second inner through hole. The air passage may be formed between the sealing plate and the valve core plate. The two outer through holes may be matched with the two first inner through holes and may be controlled by the rotation of the reversing valve core group to be aligned and connected at the exhaust position or staggered and closed at the first and second intake positions. When the inner chamber and the air baffle plate may be matched and the reversing valve core group may be in the first intake position. The inner chamber and the first air connection passage may be connected. When the reversing valve core group is in the second intake position and the exhaust position, the inner chamber and the first air connection passage may be isolated by the air baffle plate; the second air connection passage at the exhaust position, a first inner through hole, an outer through hole and the connecting port may be sequentially connected to the inner chamber, another first inner through hole, another outer through hole and the outer port, and the air connection passage at the second intake position may be respectively connected to the inner chamber and the second air connection passage through the second inner through hole and at least one first inner through hole.

Example 9. The airway device of a massage pool according to Example 8, wherein the valve core plate and the sealing plate face and abut. The abutting end face of the valve core plate may be concavely provided with a groove. The second inner through hole may be set at the bottom of the groove. The groove between the valve core plate and the sealing plate may constitute a connecting chamber. The connecting chamber may constitute the air connection passage. The connecting chamber may be connected to the upper port of the at least one first inner through hole. When the reversing valve core group may be in the first and second intake positions, the end face of the valve core plate may be sealed and matched with the outer through hole. A gap may be provided between the sealing plate and the upper port of the first inner through hole.

Example 10. The airway device of a massage pool according to Example 9, wherein the pipeline may be provided with a groove body. The lower port of the first inner through hole in the second intake position may be connected to the groove body. The second air connection passage may be connected to the groove body.

Example 11. The airway device of a massage pool according to Example 8, wherein the valve core plate may be located under the sealing plate. The drive shaft passes through the sealing plate and may be connected to the valve core plate.

Example 12. The airway device for a massage pool according to Example 8, wherein the second air connection passage may have an air connection port arranged upward. The air connection port may be provided with a control valve capable of changing between a uni-directional state and an open state. The peripheral portion of at least one of the first inner through holes of the valve core plate may extend downward to form an abutting convex base. The bottom surface of the valve core plate may be matched with the control valve. The control valve may be controlled to be in the uni-directional state and the open state by whether the abutting convex base abuts against and compresses the control valve.

Example 13. The airway device of a massage pool according to Example 3, wherein a second elastic body may be arranged between the air baffle plate and the pipeline.

Example 14. The airway device for a massage pool according to Example 8, wherein the pipeline may have an air connection section, a connecting section and a middle section arranged between the air connection section and the connecting section. The air connection section may be pipe-in-pipe structure and the inner pipe constitute the second air connection passage and the gap between the inner and outer pipes constitutes the first air connection passage. The upper edge of the middle section extends upward to form a peripheral wall. The sealing plate may be fixed in the peripheral wall. The inner of the peripheral wall and the upper part of the sealing plate may constitute the outer chamber. The inner of the middle section and the lower part of the sealing plate may constitute the inner chamber. The peripheral wall may be provided with the connecting port and the outer through port. The connecting section may be connected to the connecting port and the outer connecting port. The connecting section may be connected to the connecting port and the air pump may be arranged in the connecting section.

Example 15. The airway device of a massage pool according to Example 14, wherein the air connection section may be fixedly provided with a first connecting base protruding into the middle section. The upper end face of the first connecting base may be provided with the air connection port of the second air connection passage of the inner pipe and the first connection base seals the middle and upper part of the gap between the inner and outer pipes. The connecting section may be fixed with a second connection base that may protrude into the middle section, and the second connection base may be provided with a through hole throughout upper and lower. The inner chamber may connect the lower part of the gap between the inner and outer pipes and the connecting section. The valve core plate may be abutted on the first connecting base and the second connecting base. The through hole may be matched with the first inner through hole. The air connection port may be matched with the first inner through hole.

Example 16. A control device for an airway device of a massage pool is provided. The airway device may include a pipeline. The control device may comprise a control mechanism and an operating member. The control mechanism may comprise a reversing piece, a reversing valve core group and a drive shaft. The reversing piece may rotate in a connecting position and an isolating position relative to the pipeline. The reversing valve core group may rotate relative to the pipeline between a first intake position, an exhaust position and a second intake position. The operating member may be connected to the drive shaft in a drive manner and may drive the drive shaft to rotate to at three positions to change to a first intake state, an exhaust state and a second intake state. The drive shaft may drive and connect the reversing piece and the reversing valve core group and drive the reversing piece and the reversing valve core group to rotate through the rotation of the drive shaft. In the first intake state, the reversing piece turns to the connecting position and the reversing valve core group turns to the first intake position. In the exhaust state, the reversing piece turns to the isolating position and the reversing valve core group turns to the exhaust position. In the second intake state, the reversing piece turns to the connecting position and the reversing valve core group turns to the second intake position.

Example 17. A massage pool may comprise a pool body and a pool chamber surrounded by the pool body. The pool body may be provided with a first air connection port that is connected to the pool chamber. An air chamber may be formed in the pool body and the pool body may be provided with a second air connection port. The massage pool may further comprise the airway device of a massage pool according to Example 1. The first air connection passage and the second air connection passage may be respectively connected to the first air connection port of the pool body and the second air connection port of the pool body.

Example 18. A transmission mechanism may comprise an installation base, a drive shaft; a first moveable member, and a second movable member. The drive shaft may rotate relative to the installation base. The first movable member and the drive shaft may be synchronously rotated and connected together. The drive shaft may be drive the first movable member to rotate to two extreme positions and a middle position between the two extreme positions relative to the installation base. The second movable member may be sleeved on the outside of the drive shaft. The second movable member may be rotated to a first position and a second position relative to the installation base. An elastic body and a limiting structure may be arranged between the second movable member and the installation base. The elastic body and the limiting structure may cooperate to drive the second movable member to maintain or reset to the first position. A transmission structure may be arranged between the drive shaft and the second movable member. The drive shaft may rotate and may drive the second movable member to rotate to the second position through the transmission structure. The second position may correspond to one extreme position.

Example 19. The transmission mechanism according to Example 18, wherein the second movable member may capable of being sleeved on an inner hole of the drive shaft. An inner peripheral wall of the inner hole may be protruded with a first protrusion. The drive shaft may be concavely formed with a central angle groove. The first protrusion may be located in the central angle groove. The groove wall of the central angle groove and the first protrusion can abut and cooperate to form the above-mentioned transmission structure.

Example 20. The transmission mechanism according to Example 18, wherein the second movable member may be capable of being sleeved on an inner hole of the drive shaft. An inner peripheral wall of the inner hole may be concavely provided with a central angle groove. The drive shaft may be protruded with a first protrusion which may be located in the central angle groove. The groove wall of the central angle groove and the first protrusion can abut and cooperate to form the above-mentioned transmission structure.

Example 21. The transmission mechanism according to Example 19, wherein the central angle between the first position and the second position may be not greater than the central angle between the middle position and an extreme position corresponding to the second position.

Example 22. The transmission mechanism according to Example 21, wherein the central angle of the central angle groove may be smaller than the central angle of the two extreme positions and not smaller than the central angle between the middle position and an extreme position corresponding to the second position.

Example 23. The transmission mechanism according to Example 18, wherein the second movable member may be capable of being sleeved on an inner hole of the drive shaft. An inner peripheral wall of the inner hole may be protruded with a first protrusion. The drive shaft may be concavely formed with a central angle groove. The first protrusion may be located in the central angle groove. A first wall of the groove wall of the central angle groove may be protruded with an abutting protrusion, and the abutting protrusion and the first protrusion can abut and cooperate to form the above-mentioned transmission structure.

Example 24. The transmission mechanism according to Example 18, wherein a second protrusion may be protruded from the installation base, and the second movable member can abut against the second protrusion to form the limiting structure.

Example 25. The transmission mechanism according to Example 18, wherein the installation base may comprise a fixing plate. The drive shaft may rotatably pass through the fixing plate. The first movable member may be fixedly connected to the drive shaft and may be located under the fixing plate. The second movable member may be located on the fixing plate. The elastic body may comprise a torsion spring. The torsion spring may connect the fixing plate and the second movable member.

Example 26. The transmission mechanism according to Example 18, wherein a reinforcing rib may be protruded from the middle of the bottom of the central angle groove. The end face of the reinforcing rib may be set as an outer arc surface. The end face of the first protrusion may be provided with an inner arc surface. The outer arc surface may be matched with the inner arc surface.

Example 27. A driving mechanism may comprise an operating member and the transmission mechanism according to Example 18, wherein the operating member and the drive shaft may be fixedly mounted together.

REFERENCE MARKS

Air pump 1,
pipeline 2,
control mechanism 3;
Air connection portion 21,
first air connection passage 211,
second air connection passage 212,
inner chamber 22,
outer chamber 23,
connecting port 231,
outer port 232;
Sealing plate 24,
outer through hole 241,
air connection section 25,
connecting section 26,
middle section 27,
peripheral wall 271,
cover plate 272,
first connecting base 251,
second connecting base 261,
through hole 262,
check valve 263,
control valve 28;
Operating member 31,
ventilation passage 32,
reversing piece 33,
first elastic body 331,
first protrusion 332,
second protrusion 333, reversing valve core group 34,
valve core plate 341,
air baffle plate 342,
first inner through hole 343,
second inner through hole 344,
second elastic body 345,
abutting convex base 346,
drive shaft 35,
central angle groove 351,
abutting protrusion 352, and
reinforcing rib 353.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. An airway device of a massage pool, comprising
an air pump; and
an airway unit, the airway unit comprising
an operating member;
a pipeline, and
a control mechanism comprising a reversing piece and a reversing valve core group coupled to the reversing piece,
wherein the pipeline is formed with an air connection portion, and the air connection portion has a first air connection passage and a second air connection passage, the air pump is attached to the pipeline; wherein the control mechanism is coupled on the pipeline, and the operating member is connected to the control mechanism in a driving manner, and the operating member and the control mechanism cooperate to control the airway unit to change to a first intake state in which the first air connection passage is inflated by the air pump, an exhaust state in which the second air connection passage is exhausted by the air pump, and a second intake state in which the second air connection passage is inflated by the air pump.

2. The airway device of a massage pool according to claim 1, wherein the airway unit is formed with an inner chamber and an outer chamber, and the outer chamber is provided with a connecting port and an outer port which may be connected to the outside, the air pump is arranged between the connecting port and the inner chamber, and the control mechanism is provided with a ventilation passage,
in the first intake state, the outer port is connected to the connecting port and the inner chamber is connected to the first air connection passage,
in the exhaust state, the connecting port and the second air connection passage are connected through the outer chamber and the outer port is connected to the inner chamber,
in the second intake state, the outer port and the connecting port are connected and the ventilation passage is connected to the inner chamber and the second air connection passage.

3. The airway device for a massage pool according to claim 2, wherein the reversing piece is rotatable relative to the pipeline at a connecting position wherein the connecting port is connected to the outer port and an isolating position where the connecting port is isolated from the outer port, the reversing valve core group is rotatable relative to the pipeline between a first intake position, an exhaust position and a second intake position, and
in the first intake state, the reversing piece turns to the connecting position and the reversing valve core group turns to the first intake position;
in the exhaust state, the reversing piece turns to the isolating position and the reversing valve core group turns to the exhaust position, and
in the second intake state, the reversing piece turns to the connecting position and the reversing valve core group turns to the second intake position, and
the operating member is connected to the reversing piece and the reversing valve core group in a drive manner and drives the reversing piece and the reversing valve core group to rotate.

4. The airway device for a massage pool according to claim 3, wherein the first intake position of the reversing valve core group is located between the exhaust position of the reversing valve core group and the second intake position of the reversing valve core group.

5. The airway device of a massage pool according to claim 3, wherein the control mechanism further comprises a drive shaft, and the operating member is connected to the drive shaft to drive the drive shaft to rotate to three positions respectively corresponding to the first intake state, the exhaust state and the second intake state, the drive shaft is connected to the reversing piece and the reversing valve core group in a drive manner and drives the reversing piece to rotate between the connecting position and the isolating position through the rotation of the driving shaft, and drives the reversing valve core group to rotate between the first intake position, the exhaust position, and the second intake position.

6. The airway device of a massage pool according to claim 5, wherein a first elastic body and a limiting structure are arranged between the reversing piece and the pipeline, and the reversing piece is controlled by the cooperation of the first elastic body and the limiting structure to be reset to or maintained in the connecting position, the reversing piece is sleeved on the drive shaft and a transmission structure is arranged between the reversing piece and the drive shaft, and the drive shaft drives the reversing piece to the isolating position through the transmission structure; the drive shaft and the reversing valve core group are synchronously rotated and connected.

7. The airway device for a massage pool according to claim 6, wherein the reversing piece is capable of being sleeved on an inner hole of the driving shaft, the inner peripheral wall of the inner hole is protrudingly provided with a protrusion, and the driving shaft is concavely provided with a central angle groove, the protrusion is located in the central angle groove, and a groove wall of the central angle groove and the protrusion can abut and cooperate to form the transmission structure.

8. The airway device of a massage pool according to claim 4, wherein the pipeline is fixed with a sealing plate and the outer chamber and the inner chamber are separated by the sealing plate, and the sealing plate is provided with two outer through holes; the reversing valve core group comprises a valve core plate and an air baffle plate that are fixedly connected to each other, the valve core plate is provided with two first inner through holes and a second inner through hole, and the air passage is formed between the sealing plate and the valve core plate; the two outer through holes are matched with the two first inner through holes and are controlled by the rotation of the reversing valve core group to be aligned and connected at the exhaust position or staggered and closed at the first and second intake positions; when the inner chamber and the air baffle plate are matched and the reversing valve core group is in the first intake position, the inner chamber and the first air connection passage are connected, and when the reversing valve core group is in the second intake position and the exhaust position, the inner chamber and the first air connection passage are isolated by the air baffle plate; the second air connection passage at the exhaust position, a first inner through hole, an outer through hole and the connecting port are sequentially connected to the inner chamber, another first inner through hole, another outer through hole and the outer port, and the air connection passage at the second intake position is respectively connected to the inner chamber and the second air connection passage through the second inner through hole and at least one first inner through hole.

9. The airway device of a massage pool according to claim 8, wherein the valve core plate and the sealing plate face and abut, the abutting end face of the valve core plate is concavely provided with a groove, and the second inner through hole is set at the bottom of the groove, the groove between the valve core plate and the sealing plate constitutes a connecting chamber, the connecting chamber constitutes the ventilation passage, and the connecting chamber is connected to the upper port of the at least one first inner through hole, and when the reversing valve core group is in the first and second intake positions, the end face of the valve core plate is sealed and matched with the outer through hole; a gap is provided between the sealing plate and the upper port of the first inner through hole.

10. The airway device of a massage pool according to claim 9, wherein the pipeline is provided with a groove body, the lower port of the first inner through hole in the second intake position is connected to the groove body, and the second air connection passage is connected to the groove body.

11. The airway device of a massage pool according to claim 8, wherein the valve core plate is located under the sealing plate, and the drive shaft passes through the sealing plate and is connected to the valve core plate.

12. The airway device for a massage pool according to claim 8, wherein the second air connection passage has an air connection port arranged upward, and the air connection port is provided with a control valve capable of changing between a uni-directional state and an open state, the peripheral portion of at least one of the first inner through holes of the valve core plate extends downward to form an abutting convex base, the bottom surface of the valve core plate is matched with the control valve, and the control valve is controlled to be in the uni-directional state and the open state by whether the abutting convex base abuts against and compresses the control valve.

13. The airway device of a massage pool according to claim 3, wherein a second elastic body is arranged between the air baffle plate and the pipeline.

14. The airway device for a massage pool according to claim 8, wherein the pipeline has an air connection section, a connecting section and a middle section arranged between the air connection section and the connecting section; the air connection section is pipe-in-pipe structure and the inner pipe constitute the second air connection passage and the gap between the inner and outer pipes constitutes the first air connection passage; the upper edge of the middle section extends upward to form a peripheral wall, the sealing plate is fixed in the peripheral wall, and the inner of the peripheral wall and the upper part of the sealing plate constitute the outer chamber, the inner of the middle section and the lower part of the sealing plate constitute the inner chamber, the peripheral wall is provided with the connecting port and the outer through port, the connecting section is connected to the connecting port and the outer connecting port, the connecting section is connected to the connecting port and the air pump is arranged in the connecting section.

15. The airway device of a massage pool according to claim 14, wherein the air connection section is fixedly provided with a first connecting base protruding into the middle section, and the upper end face of the first connecting base is provided with the air connection port of the second air connection passage of the inner pipe and the first connection base seals the middle and upper part of the gap between the inner and outer pipes; the connecting section is fixed with a second connection base that protrudes into the middle section, and the second connection base is provided with a through hole throughout upper and lower, the inner chamber connects the lower part of the gap between the inner and outer pipes and the connecting section; the valve core plate is abutted on the first connecting base and the second connecting base, the through hole can be matched with the first inner through hole, the air connection port can be matched with the first inner through hole.

16. A control device for an airway device of a massage pool, the airway device includes a pipeline, the control device comprising:

a control mechanism, and an operating member, the control mechanism comprising a reversing piece, a reversing valve core group and a drive shaft, and the reversing piece rotates in a connecting position and an isolating position relative to the pipeline, the reversing valve core group rotates relative to the pipeline between a first intake position, an exhaust position and a second intake position, and the operating member is connected to the drive shaft in a drive manner and drives the drive shaft to rotate to at three positions to change to a first intake state, an exhaust state and a second intake state, the drive shaft drives and connects the reversing piece and the reversing valve core group and drives the reversing piece and the reversing valve core group to rotate through the rotation of the drive shaft; in the first intake state, the reversing piece turns to the connecting position and the reversing valve core group turns to the first intake position; in the exhaust state, the reversing piece turns to the isolating position and the reversing valve core group turns to the exhaust position; in the second intake state, the reversing piece turns to the connecting position and the reversing valve core group turns to the second intake position.

17. A massage pool, comprising a pool body and a pool chamber surrounded by the pool body, the pool body is provided with a first air connection port that is connected to the pool chamber, an air chamber is formed in the pool body and the pool body is provided with a second air connection port; wherein further comprising the airway device of a massage pool according to claim 1, the first air connection passage and the second air connection passage are respectively connected to the first air connection port of the pool body and the second air connection port of the pool body.

* * * * *